(12) United States Patent
Young et al.

(10) Patent No.: US 8,469,326 B1
(45) Date of Patent: *Jun. 25, 2013

(54) TELESCOPING SUPPORT STAND APPARATUS

(75) Inventors: Nathan E. Young, Monroe, UT (US); Anthony A. Foster, Brookhaven, MS (US)

(73) Assignee: Primos, Inc., Flora, MS (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/601,949

(22) Filed: Aug. 31, 2012

Related U.S. Application Data

(63) Continuation of application No. 13/436,160, filed on Mar. 30, 2012, now Pat. No. 8,256,732, which is a continuation of application No. 12/198,560, filed on Aug. 26, 2008, now Pat. No. 8,146,876, which is a continuation-in-part of application No. 11/556,606, filed on Nov. 3, 2006, now Pat. No. 7,845,602.

(60) Provisional application No. 60/771,751, filed on Feb. 9, 2006.

(51) Int. Cl.
*F16M 11/00* (2006.01)

(52) U.S. Cl.
USPC ........ 248/412; 248/169; 248/161; 403/109.1; 403/109.7

(58) Field of Classification Search
None
See application file for complete search history.

(56) References Cited

U.S. PATENT DOCUMENTS

| | | |
|---|---|---|
| 258,038 A | 5/1882 | Evarts |
| 1,231,262 A | 6/1917 | Katchmazenski |
| 1,858,595 A | 5/1932 | Parker |
| 1,859,223 A | 5/1932 | Stevenson |
| 1,867,289 A | 7/1932 | Ercole |
| 2,010,292 A | 8/1935 | Campbell |
| 2,010,306 A | 8/1935 | Leech |
| 2,261,505 A | 11/1941 | Schlesinger |
| 2,291,747 A | 8/1942 | Neuwirth |
| 2,329,932 A | 9/1943 | Nelson |

(Continued)

FOREIGN PATENT DOCUMENTS

| | | |
|---|---|---|
| DE | 9404608 | 8/1994 |
| DE | 4430978 | 4/1995 |

(Continued)

OTHER PUBLICATIONS

Photographs of a monopod stand, Monfrotto Model #685B, source and date unknown.

(Continued)

*Primary Examiner* — Bradley Duckworth
(74) *Attorney, Agent, or Firm* — Holland and Hart LLP

(57) ABSTRACT

A telescoping support stand comprising a first tube partially defining a first enclosed area and a second tube partially defining a second enclosed area. A first end of the second tube may be telescopically slidable within the first tube. The telescoping support stand may also comprise a first locking mechanism attached to the second tube. The first locking mechanism may releasably secure the first tube to the second tube. The telescoping support stand may also comprise a first air exchange aperture dimensioned to allow air to flow between the first and second enclosed areas. The telescoping support stand may further comprise a release mechanism and a release rod attached to the first locking mechanism. The release mechanism may comprise a displacement member adjacent to the release rod, the displacement member being configured to displace the release rod and release the first locking mechanism.

22 Claims, 30 Drawing Sheets

U.S. PATENT DOCUMENTS

| | | |
|---|---|---|
| 2,555,515 A | 6/1951 | Slater |
| 2,658,777 A | 11/1953 | Gerard |
| 2,695,504 A | 11/1954 | Magee |
| 2,695,800 A | 11/1954 | Soucy |
| 2,938,699 A | 5/1960 | Bellman |
| 3,048,360 A | 8/1962 | Foley |
| 3,126,187 A | 3/1964 | Mooney |
| 3,228,647 A | 1/1966 | Musianowycz |
| 3,461,769 A | 8/1969 | Brosseit |
| 3,666,311 A | 5/1972 | McMullin |
| 3,669,224 A | 6/1972 | Billeter |
| 3,730,481 A | 5/1973 | Ekonen et al. |
| 3,791,624 A | 2/1974 | Payson |
| 3,807,574 A | 4/1974 | Lanza |
| 3,835,486 A | 9/1974 | Benoit |
| 3,843,271 A | 10/1974 | Bjerknes |
| 3,866,964 A | 2/1975 | Prater |
| 4,073,456 A | 2/1978 | Karapita |
| 4,113,222 A | 9/1978 | Frinzel |
| 4,188,007 A | 2/1980 | Ubezio |
| 4,239,169 A | 12/1980 | DeSantis |
| 4,318,526 A | 3/1982 | Werner |
| 4,374,581 A | 2/1983 | Karapita |
| 4,445,660 A | 5/1984 | Karapita |
| 4,526,334 A | 7/1985 | Rantakari |
| 4,619,548 A | 10/1986 | Kazaoka |
| 4,706,916 A | 11/1987 | Cullmann et al. |
| 4,799,818 A | 1/1989 | Sudimak |
| 4,918,896 A | 4/1990 | Wiese |
| 4,925,364 A | 5/1990 | Das |
| 5,011,104 A | 4/1991 | Fang |
| 5,078,349 A | 1/1992 | Smith |
| 5,333,976 A | 8/1994 | Dobbrunz |
| 5,341,185 A | 8/1994 | Nakatani |
| 5,465,671 A | 11/1995 | Genest |
| 5,492,430 A | 2/1996 | Jones |
| 5,570,968 A | 11/1996 | Sassmannshausen et al. |
| 5,575,448 A | 11/1996 | Battocchio |
| 5,589,903 A | 12/1996 | Speggiorin |
| 5,605,101 A | 2/1997 | Lindsay |
| 5,662,429 A | 9/1997 | Battocchio |
| 5,697,757 A | 12/1997 | Lindsay |
| 5,707,167 A | 1/1998 | Battocchio |
| 5,708,889 A | 1/1998 | Speggiorin |
| 5,716,062 A | 2/1998 | Lindsay |
| 5,720,369 A | 2/1998 | Thorn |
| 5,729,108 A | 3/1998 | Steele |
| 5,740,998 A | 4/1998 | Lindsay |
| 5,823,491 A | 10/1998 | Lindsay |
| 5,887,835 A | 3/1999 | Hein et al. |
| 5,944,152 A | 8/1999 | Lindsay et al. |
| 5,971,334 A | 10/1999 | Crawshaw |
| 6,019,556 A | 2/2000 | Hess |
| 6,027,087 A | 2/2000 | Lindemann et al. |
| 6,050,575 A | 4/2000 | Lindsay |
| 6,073,903 A | 6/2000 | Lindsay |
| 6,092,770 A | 7/2000 | Battocchio |
| 6,152,638 A | 11/2000 | Lindsay |
| 6,164,843 A | 12/2000 | Battocchio |
| 6,176,783 B1 | 1/2001 | Lindsay |
| 6,202,663 B1 | 3/2001 | Uemura |
| 6,364,275 B1 | 4/2002 | Lindsay |
| 6,368,053 B1 | 4/2002 | Knight, Sr. |
| 6,401,948 B1 | 6/2002 | Huang |
| 6,416,024 B1 | 7/2002 | Lindsay |
| 6,513,784 B2 | 2/2003 | Lindsay |
| 6,523,707 B2 | 2/2003 | Liu |
| 6,574,924 B2 | 6/2003 | Maniezzo |
| 6,609,686 B2 | 8/2003 | Malizia |
| 6,626,412 B1 | 9/2003 | Lindsay |
| 6,641,095 B2 | 11/2003 | Lindsay |
| 6,698,698 B1 | 3/2004 | Hsieh |
| 6,722,052 B2 | 4/2004 | Wu |
| 6,769,654 B2 | 8/2004 | Lindsay |
| 6,796,446 B2 | 9/2004 | Segall |
| 6,824,319 B1 | 11/2004 | Speggiorin |
| 6,869,112 B2 | 3/2005 | Guidetti |
| 6,877,442 B2 | 4/2005 | Helle |
| 6,913,231 B2 | 7/2005 | Speggiorin |
| 6,983,916 B2 | 1/2006 | Raynaud |
| D515,614 S | 2/2006 | Speggiorin |
| 7,311,048 B2 | 12/2007 | Kopala |
| 7,506,846 B2 | 3/2009 | Speggiorin |
| 7,845,602 B1 | 12/2010 | Young et al. |

FOREIGN PATENT DOCUMENTS

| | | |
|---|---|---|
| DE | 19521710 | 1/1996 |
| DE | 4497719 | 12/1996 |
| DE | 69309696 | 12/1997 |
| DE | 19781733 | 4/1999 |
| DE | 69506347 | 4/1999 |
| DE | 69322104 | 6/1999 |
| DE | 69130774 | 8/1999 |
| DE | 69509720 | 9/1999 |
| DE | 69604281 | 5/2000 |
| DE | 69606926 | 10/2000 |
| DE | 19983074 | 7/2001 |
| DE | 69614866 | 4/2002 |
| DE | 19983863 | 10/2002 |
| DE | 69331770 | 11/2002 |
| DE | 69804761 | 11/2002 |
| DE | 10196419 | 6/2003 |
| DE | 10196591 | 7/2003 |
| DE | 69722036 | 2/2004 |
| DE | 69821568 | 12/2004 |
| DE | 19512502 | 6/2005 |
| DE | 60110815 | 2/2006 |
| EP | 0693853 | 1/1996 |
| EP | 0702192 | 3/1996 |
| EP | 0752554 | 1/1997 |
| EP | 0777057 | 6/1997 |
| EP | 0823396 | 2/1998 |
| EP | 0908663 | 4/1999 |
| EP | 0702191 | 5/1999 |
| EP | 0926425 | 6/1999 |
| EP | 0952383 | 10/1999 |
| EP | 1106118 | 6/2001 |
| EP | 1316232 | 5/2005 |
| EP | 1236007 | 11/2005 |
| EP | 1301741 | 3/2006 |
| EP | 1525422 | 9/2006 |
| GB | 2288430 | 10/1995 |
| GB | 2291468 | 1/1996 |
| GB | 2298570 | 9/1996 |
| GB | 2298671 | 9/1996 |
| GB | 2310410 | 8/1997 |
| GB | 2323828 | 10/1998 |
| GB | 2331697 | 6/1999 |
| GB | 2332663 | 6/1999 |
| GB | 2335642 | 9/1999 |
| GB | 2353946 | 3/2001 |
| GB | 2359590 | 8/2001 |
| GB | 2359743 | 9/2001 |
| GB | 2364633 | 2/2002 |
| GB | 2364756 | 2/2002 |
| GB | 2366592 | 3/2002 |
| GB | 2364038 | 6/2002 |
| GB | 2371283 | 7/2002 |
| GB | 2374529 | 10/2002 |
| GB | 2361180 | 12/2002 |
| GB | 2375093 | 5/2004 |
| GB | 2396344 | 6/2004 |
| GB | 2400834 | 5/2005 |
| JP | 08171136 | 7/1996 |
| JP | 08193693 | 7/1996 |
| JP | 11166690 | 6/1999 |
| JP | 11248090 | 9/1999 |
| JP | 11311398 | 11/1999 |
| JP | 2001337608 | 12/2001 |
| JP | 2002125140 | 4/2002 |
| WO | 9429637 | 12/1994 |
| WO | 9630693 | 10/1996 |
| WO | 9711308 | 3/1997 |
| WO | 9727419 | 7/1997 |
| WO | 9731216 | 8/1997 |
| WO | 9741383 | 11/1997 |
| WO | 9836208 | 8/1998 |

| | | |
|---|---|---|
| WO | 9933744 | 7/1999 |
| WO | 0039498 | 7/2000 |
| WO | 0043709 | 7/2000 |
| WO | 0142706 | 6/2001 |
| WO | 0163130 | 8/2001 |
| WO | 0202988 | 1/2002 |
| WO | 0205685 | 1/2002 |
| WO | 0206683 | 1/2002 |
| WO | 0206721 | 1/2002 |
| WO | 0206722 | 1/2002 |
| WO | 0221000 | 3/2002 |
| WO | 02097530 | 12/2002 |
| WO | 03008855 | 1/2003 |
| WO | 03048588 | 6/2003 |
| WO | 03053636 | 7/2003 |
| WO | 03081121 | 10/2003 |
| WO | 03083350 | 10/2003 |
| WO | 03083351 | 10/2003 |
| WO | 2004011843 | 2/2004 |
| WO | 2004056692 | 7/2004 |
| WO | 2004068023 | 8/2004 |
| WO | 2004068024 | 8/2004 |
| WO | 2005068894 | 7/2005 |
| WO | 2005068895 | 7/2005 |
| WO | 2005069072 | 7/2005 |
| WO | 2005114037 | 12/2005 |
| WO | 2006027067 | 3/2006 |

OTHER PUBLICATIONS

Photographs of a yellow surveyor stick, source and date unknown.

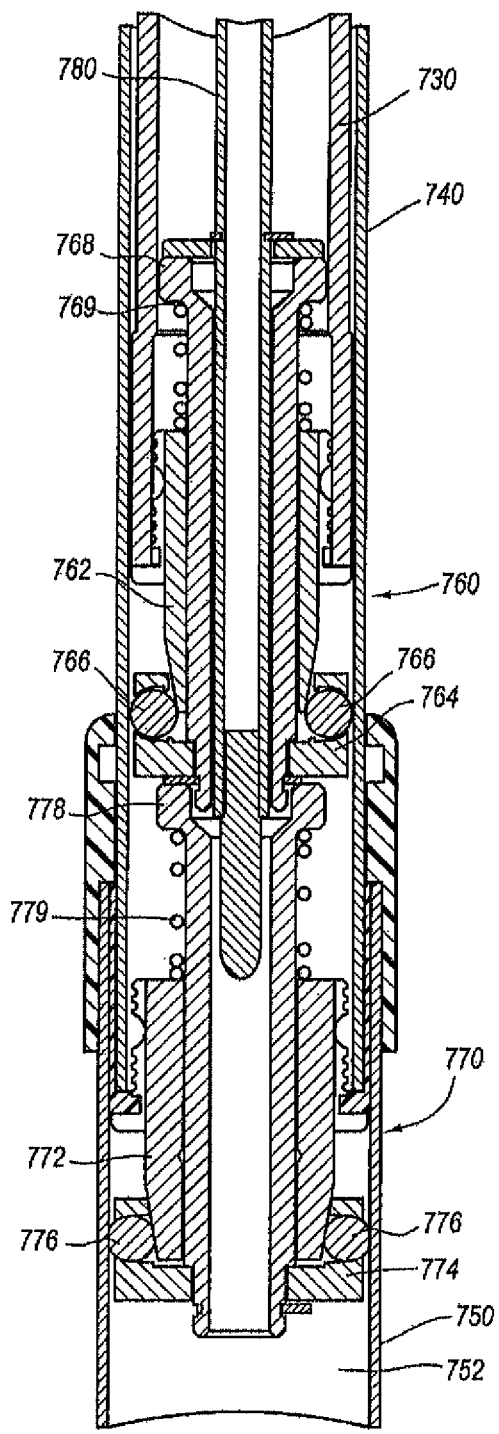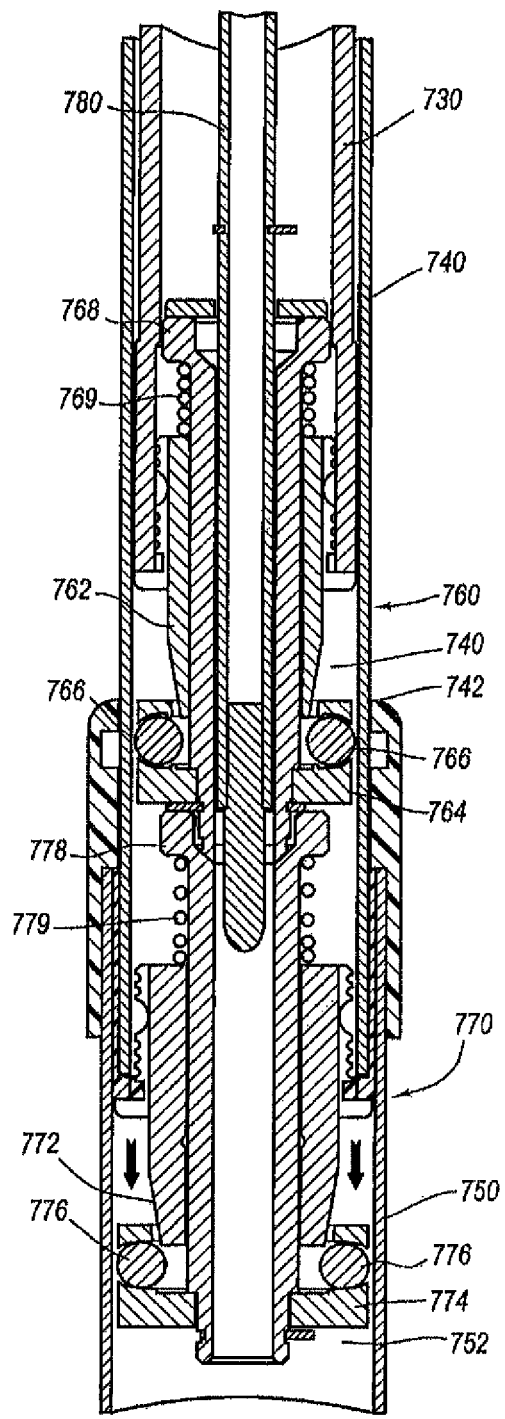
*FIG. 17*      *FIG. 18*

TELESCOPING SUPPORT STAND APPARATUS

CROSS REFERENCE TO RELATED APPLICATIONS

This application is a continuation of U.S. patent application Ser. No. 13/436,160, filed 30 Mar. 2012, now U.S. Pat. No. 8,256,732, which is a continuation U.S. patent application Ser. No. 12/198,560, filed 26 Aug. 2008, now U.S. Pat. No. 8,146,876, which is a continuation-in-part of U.S. patent application Ser. No. 11/556,606, filed 3 Nov. 2006, now U.S. Pat. No. 7,845,602, which claims the benefit of U.S. Provisional Application No. 60/771,751, filed 9 Feb. 2006, the disclosures of which are incorporated, in their entireties, by this reference.

BACKGROUND

Support stands, such as microphone stands and shooting stands, often include telescoping tubes that allow the height of the stands to be adjusted. These telescoping stands may have an inner tube, an outer tube, and a lock that keeps the inner tube from sliding relative to the outer tube. Such stands may be used in situations that require the stands to be rugged and capable of withstanding the elements. For example, hunter's shooting stands, microphone stands, telescope stands, and camera stands are often used outdoors. The components of a stand intended for outdoor use may need to be sealed and tightly fitted to keep water, dirt, and other debris from getting inside the tubes of the stand.

A user may adjust the height of a telescoping support stand by releasing the lock and moving the inner tube up and down within the outer tube. The lock may be a collar that is rotatable to compress the inner tube and the outer tube, binding them at a set length. The lock may also be a set screw bolt that passes through the outer tube and presses against the inner tube. One problem with these types of locks is the time it takes for a user to turn the collar or bolt when making a height adjustment to the stand. Another problem with these locks is that the user may have to hold the inner tube in position while fastening the lock, thus requiring the use of two hands.

Some support stands are equipped with an external trigger connected to an internal lock that secures the inner tube to the outer tube. This locking configuration may allow a user to make quick height adjustments and may permit the user to make adjustments using only one hand. For additional convenience and adjustment speed, the external trigger may be placed on a handle attached to the top of the inner tube. While there are many benefits to a quick-adjustment configuration that utilizes an internal locking mechanism and a handle trigger, there are numerous problems associated with such a support stand configuration.

For example, an internal lock may restrict the flow of air between the inner and outer tubes. The internal lock may be sized to fit snugly within the inner tube and press securely against the outer tube, which closes off the air passageway between the inner and outer tubes. Furthermore, as previously mentioned, support stands are often manufactured to keep water and other debris out, which prevents air from freely flowing in and out of the stand. Thus, air cannot easily flow into, out of, or between the tubes of rugged support stands with internal locks.

When air is unable to quickly enter, exit, or flow between the tubes of a support stand, it is more difficult to make rapid height adjustments to the stand. For example, when a user attempts to extend the length of the stand, the volume inside the outer tube expands, but air is not able to rapidly enter the outer tube and fill the new volume. This vacuum effect creates resistance against a user's attempt to increase the height of the stand. Conversely, when a user attempts to shorten the stand, the volume inside the outer tube decreases. A dampening effect results when air is not able to quickly exit the outer tube. This dampening effect creates resistance against a user's attempt to shorten the stand.

When the airflow within a stand is restricted, a user may need to use two hands to overcome the vacuum and dampening effects to adjust the height of the stand. For example, users may hold the inner tube with one hand while pulling down on the outer tube with the other hand. Users may also hold the outer tube between their feet while pulling up on the inner tube. This situation is undesirable when the user needs to make a quick adjustment or does not have a free hand to help make the adjustment.

Another problem with the quick-adjustment stand configuration is that a user may inadvertently pull the trigger while gripping the handle. For example, a hunter targeting a moving bull elk may keep one hand on the handle of a shooting stand to be ready to make height adjustments. However, in the excitement of taking a shot at the large bull, with the weight of a gun resting on the shooting stand, the hunter may accidentally activate the trigger on the stand, which would drop the height of the stand as he shoots. This situation is dangerous and could result in an inaccurate shot.

BRIEF SUMMARY

According to at least one embodiment, a telescoping support stand may comprise a first tube partially defining a first enclosed area and a second tube partially defining a second enclosed area, a first end of the second tube being telescopically slidable within the first tube. The telescoping support stand may also comprise a first locking mechanism attached to the second tube, the first locking mechanism releasably securing the first tube to the second tube to prevent longitudinal movement of the first tube relative to the second tube. The telescoping support stand may further comprise a first air exchange aperture dimensioned to allow air to flow between the first and second enclosed areas. In certain embodiments, the first air exchange aperture may comprise an opening in the first locking mechanism. In some embodiments, the first air exchange aperture may comprise a gap between the first locking mechanism and the first tube. In many embodiments, the first air exchange aperture may comprise a notch in the first locking mechanism.

The telescoping support stand may also comprise a second air exchange aperture dimensioned to allow air to exit the second tube. In certain embodiments, the second air exchange aperture may comprise an opening in the second tube. The telescoping support stand may include a head attached to a second end of the first tube, and the second air exchange aperture may allow air to flow from the second tube into the head. In some embodiments, the telescoping support stand may include a third air exchange aperture dimensioned to allow air to exit the head.

In certain embodiments, the first locking mechanism may comprise a truncated-cone member attached to the first end of the second tube and a bearing assembly comprising a bearing retainer and a plurality of bearings. The bearing retainer may comprise an opening for receiving the truncated-cone member, and the bearing assembly may be movable between first and second positions relative to the truncated-cone member. In some embodiments, the truncated-cone member may be dimensioned to press the bearings against an interior surface of the first tube while in the first position, and the truncated-cone member may be dimension to allow the bearings to move away from the interior surface of the first tube while in the second position. In certain embodiments, the truncated-cone member may partially define the first air exchange aperture. In some embodiments, the bearing assembly may at least partially define the first air exchange aperture, and the first locking mechanism may partially define each of the first and second enclosed areas.

In many embodiments, the telescoping support stand may comprise a release mechanism attached to a second end of the second tube. The release mechanism may be movable to release the first locking mechanism to allow longitudinal movement of the first tube relative to the second tube. In some embodiments, the release mechanism may comprise a handle attached to the second end of the second tube, the handle comprising an outside surface. The telescoping support stand may also comprise a trigger attached to the handle, the trigger comprising an inside surface positioned opposite the outside surface of the handle, the trigger being dimensioned to allow a user to hold the handle by placing a portion of a hand between the outside surface of the handle and the inside surface of the trigger, the trigger being movable to release the first locking mechanism to allow longitudinal movement of the first tube relative to the second tube.

According to certain embodiments, the telescoping support stand may comprise a release rod attached to the first locking mechanism, and the first air exchange aperture may comprise an opening in the release rod. The telescoping support stand may also comprise a release mechanism movable to cause the release rod to release the first locking mechanism and allow longitudinal movement of the first tube relative to the second tube.

In some embodiments, the telescoping support stand may comprise a third tube partially defining a third enclosed area, a first end of the third tube being telescopically slidable within the second tube. The telescoping support stand may also comprise a second locking mechanism attached to the third tube, the second locking mechanism releasably securing the second tube to the third tube to prevent longitudinal movement of the second tube relative to the third tube. Furthermore, the telescoping support stand may include a second air exchange aperture dimensioned to allow air to flow between the second and third enclosed areas.

In certain embodiments, the telescoping support stand may comprise a first leg comprising the first and second tubes and a second leg attached to the first leg, the second leg comprising third and fourth tubes. According to some embodiments, the telescoping support stand may comprise a head attached to the first tube, the head being adapted to attach to at least one of: a microphone clip, a camera, a telescope, a spotting scope, binoculars, a surveyor level, and/or a gun rest. The gun rest may be attached to a second end of the second tube.

In certain embodiments, the first air exchange aperture may extend between the first and second enclosed areas. In some embodiments, the first locking mechanism may be released by pulling the first tube away from the second tube.

According to at least one embodiment, a telescoping support stand may comprise a first tube partially defining a first enclosed area, a second tube partially defining a second enclosed area, a first end of the second tube being telescopically slidable within the first tube, a first air exchange aperture dimensioned to allow air to exit the second tube, a locking mechanism attached to the second tube, the locking mechanism releasably securing the first tube to the second tube to prevent longitudinal movement of the first tube relative to the second tube, and a second air exchange aperture dimensioned to allow air to flow between the first and second enclosed areas.

According to certain embodiments, the second tube at least partially defines the first air exchange aperture and the locking mechanism at least partially defines the second air exchange aperture. In many embodiments, the second air exchange aperture comprises at least one of: an opening in the locking mechanism, a notch in the locking mechanism, a gap between the locking mechanism and an interior surface of the first tube, and a gap between the locking mechanism and a release rod.

In some embodiments, the telescoping support stand may comprise a release rod attached to the locking mechanism, wherein the second aperture comprises an opening in the release rod. The telescoping support stand may also comprise a release mechanism in contact with the release rod, the release mechanism being movable to cause the release rod to release the locking mechanism and allow longitudinal movement of the first tube relative to the second tube. The telescoping support stand may further comprise an attachment member connecting the release rod to the release mechanism, wherein the first aperture comprises an opening in the attachment member.

According to many embodiments, the locking mechanism may be adapted to releasably secure the first tube to the second tube by pressing against an inside surface of the first tube. The telescoping support stand may also comprise an end cap attached to the first tube, wherein the end cap, the first tube, and the locking mechanism define the first enclosed area. The telescoping support stand may also comprise a head attached to the second tube, wherein the head, the second tube, and the locking mechanism define the second enclosed area.

According to at least one embodiment, a telescoping support stand may comprise a leg comprising first and second tubes, a locking mechanism adapted to prevent longitudinal movement of the first tube relative to the second tube, a handle attached to the leg, the handle comprising an outside surface. The telescoping support stand may also comprise a trigger attached to the handle, the trigger having an inside surface positioned opposite the outside surface of the handle. The trigger may be dimensioned to allow a user to hold the handle by placing a portion of a hand between the outside surface of the handle and the inside surface of the trigger, and the trigger may be movable to release the locking mechanism to allow longitudinal movement of the first tube relative to the second tube.

In some embodiments, a first end of the second tube is telescopically slidable within the first tube and the handle is attached to a second end of the second tube. In many embodiments, the telescoping support stand may further comprise a locking mechanism attached to the second tube, the locking mechanism being responsive to the trigger to releasably secure the first tube to the second tube to prevent longitudinal movement of the first tube relative to the second tube. According to certain embodiments, the locking mechanism, the second tube, and the handle may define a first enclosed area. The telescoping support stand may also comprise an end cap attached to the first tube, wherein the end cap, the first tube, and the locking mechanism define a second enclosed area. According to certain embodiments, the telescoping support stand comprises a first air exchange aperture dimensioned to allow air to flow between the first and second enclosed areas.

According to various embodiments, the telescoping support stand further comprises a second air exchange aperture dimensioned to allow air flow from the first enclosed area to the handle. The telescoping support stand may also include a third air exchange aperture dimensioned to allow air to exit the handle. In some embodiments, the telescoping support stand comprises a gun rest attached to the handle.

In at least one embodiment, a method of assembling a telescoping support stand comprises providing a first tube and providing a second tube comprising first and second ends, the first end of the second tube being telescopically slidable within the first tube. The first tube may partially define a first enclosed area and the second tube may partially define a second enclosed area. The method may also comprise providing a locking mechanism dimensioned to allow air to flow between the first and second enclosed areas. The method may further comprise attaching the locking mechanism to the second tube at the first end, the locking mechanism being adapted to releasably secure the first tube to the second tube to prevent longitudinal movement of the first tube relative to the second tube. In various embodiments, the method may comprise attaching a release mechanism to the second tube at the second end, the release mechanism being movable to release the locking mechanism to allow longitudinal movement of the first tube relative to the second tube. The method may also comprise sliding the second tube into the first tube.

According to at least one embodiment, a telescoping support stand may comprise a first tube and a second tube. A first end of the second tube may be telescopically slidable within the first tube. The telescoping support stand may also include a truncated cone extending from the first end of the second tube, a top portion of the truncated cone having a larger diameter than a bottom portion of the truncated cone. According to some embodiments, the telescoping support stand comprises a bearing assembly with bearings. The bearing assembly may be disposed around at least a portion of the truncated cone such that the bearing assembly is movable between first and second positions relative to the truncated cone, the top portion of the truncated cone pushing the bearings against an inside surface of the first tube when the bearing assembly is in the first position, the bottom portion of the truncated cone allowing the bearings to move away from the interior surface of the first tube when the bearing assembly is in the second position.

According to at least one embodiment, a telescoping support stand may comprise a leg with first and second tubes, a locking mechanism adapted to prevent longitudinal movement of the first tube relative to the second tube, a trigger coupled to the locking mechanism, and a spring connected to the trigger to bias the trigger in a first position.

According to at least one embodiment, a telescoping support stand may comprise a first tube partially defining a first enclosed area, a second tube partially defining a second enclosed area, and a third tube partially defining a third enclosed area. A first end of the first tube may be telescopically slidable within the second tube, and a first end of the second tube may be telescopically slidable within the third tube. A first locking mechanism may be attached to the first tube, and the first locking mechanism may releasably secure the first tube to the second tube to prevent longitudinal movement of the second tube relative to the first tube. A second locking mechanism may be attached to the second tube, and the second locking mechanism may releasably secure the first tube to the second tube to prevent the second tube from collapsing into the third tube. In certain embodiments, the second locking mechanism may allow the second tube to be pulled to an expanded position relative to the third tube. A first air exchange aperture may allow air to flow between the first and second enclosed areas, and a second air exchange aperture may allow air to flow between the second and third enclosed areas.

In some embodiments, the telescoping support stand may further comprise a release rod attached to the first locking mechanism. In various embodiments, a bottom portion of the first locking mechanism may be dimensioned to release the second locking mechanism.

In additional embodiments, a telescoping support stand may comprise two or more extendable legs, at least one of the extendable legs comprising a first tube, a first enclosed area being at least partially defined within the first tube. Additionally, at least one of the extendable legs may comprise a second tube, a first end of the second tube being telescopically slidable within the first tube, wherein a second enclosed area is at least partially defined within the second tube. At least one of the extendable legs may also comprise a first locking mechanism attached to the second tube, the first locking mechanism releasably securing the first tube to the second tube to prevent longitudinal movement of the first tube relative to the second tube. At least one of the extendable legs may additionally comprise a first air exchange aperture dimensioned to allow air to flow between the first and second enclosed areas.

According to various embodiments, a telescoping support stand may comprise two or more extendable legs, each of the two or more extendable legs comprising a first tube and a corresponding second tube, the first tube in each of the two or more extendable legs being telescopically slidable within the corresponding second tube. Each of the two or more extendable legs may additionally comprise a locking mechanism in each of the two or more extendable legs, each of the locking mechanisms being adapted to prevent longitudinal movement of the first tube relative to the second corresponding tube. Each of the two or more extendable legs may also comprise a release mechanism coupled to the two or more extendable legs, the release mechanism being configured to release the locking mechanism in each of the two or more extendable legs to allow longitudinal movement of the first tube relative to the corresponding second tube in each of the two or more extendable legs.

According to certain embodiments, a method of assembling a telescoping support stand may comprise providing two or more extendable legs, at least one of the extendable legs comprising a first tube, a first enclosed area being at least partially defined within the first tube. Additionally, at least one of the extendable legs may comprise a second tube comprising first and second ends, the first end of the second tube being telescopically slidable within the first tube, wherein a second enclosed area is at least partially defined within the second tube. The method may further comprise providing a locking mechanism in each of the extendable legs, the locking mechanism being dimensioned to allow air to flow between the first and second enclosed areas. The method may additionally comprise attaching the locking mechanism to the second tube at the first end, the locking mechanism being adapted to releasably secure the first tube to the second tube to prevent longitudinal movement of the first tube relative to the second tube. The method may also comprise attaching a release mechanism to the second tube at the second end, the release mechanism being movable to release the locking mechanism to allow longitudinal movement of the first tube relative to the second tube. In addition, the method may comprise sliding the second tube into the first tube.

BRIEF DESCRIPTION OF THE DRAWINGS

The accompanying drawings illustrate a number of embodiments of the instant disclosure and are part of the specification. Together with the following description, the drawings demonstrate and explain the principles of the instant disclosure.

FIG. 17 is a cross-sectional side view of the telescoping support stand of FIG. 15 according to certain embodiments.

FIG. 18 is a cross-sectional side view of the telescoping support stand of FIG. 15 according to certain embodiments.

DETAILED DESCRIPTION

Figure 1:
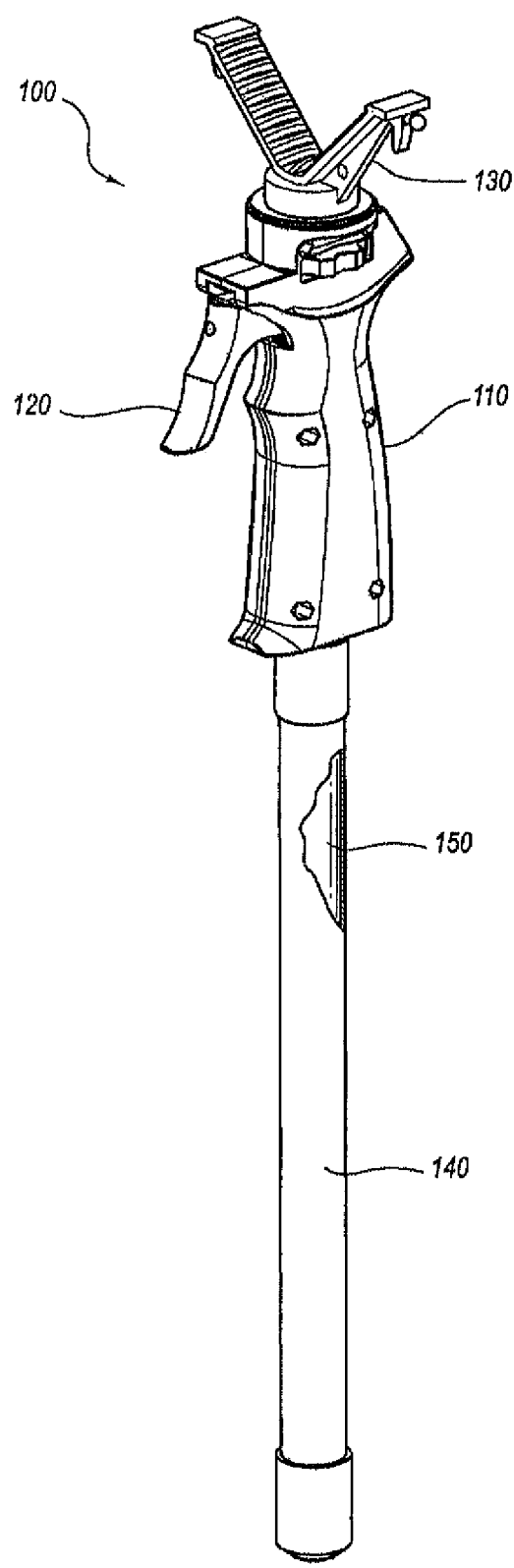
FIG. 1 is a perspective view of an exemplary telescoping support stand according to certain embodiments.

Throughout the drawings identical reference characters and descriptions indicate similar, but not necessarily identical, elements. While embodiments of the instant disclosure are susceptible to various modifications and alternative forms, specific embodiments have been shown by way of example in the drawings and will be described in detail herein. However, one of skill in the art will understand that embodiments of the instant disclosure are not intended to be limited to the particular forms disclosed herein. Rather, the instant disclosure covers all modifications, equivalents, and alternatives falling within the scope of embodiments defined by the appended claims.

FIG. 1 is a perspective view of a telescoping support stand according to some embodiments. Telescoping support stand 100 may include an outer tube 140 and an inner tube 150, and inner tube 150 may be telescopically slidable within outer tube 140. Inner tube 150 may have a smaller diameter than outer tube 140, which may allow inner tube 150 to be telescopically slidable within outer tube 140. Inner tube 150 and outer tube 140 may be referred to as a leg of telescoping support stand 100.

As shown in FIG. 1, outer tube 140 and inner tube 150 may be cylindrical elongate tubes. In certain embodiments, outer tube 140 and inner tube 150 may be any shape of elongate tube. For example, inner tube 150 and outer tube 140 may be rectangular, elliptical, or triangular elongate tubes. Outer tube 140 and inner tube 150 may be formed of any type or combination of materials, such as metal (e.g., aluminum or stainless steel), plastic, wood, or any other suitable material. Inner tube 150 and outer tube 140 may also be various lengths.

Inner tube 150 may be connected to a head, such as a handle 110, as shown in FIG. 1. In certain embodiments, handle 110 may be attached to outer tube 140 instead of being attached to inner tube 150. Handle 110 may include a release mechanism, such as a trigger 120. According to some embodiments, a release mechanism may also be a button or other any other device capable of actuating a locking mechanism. While trigger 120 is shown in FIG. 1 to be attached to handle 110, trigger 120 may also be attached to other portions of telescoping support stand 100. For example, trigger 120 may be attached directly to inner tube 150 or to outer tube 140.

Handle 110 and trigger 120 may also be formed of any suitable material, including metal, plastic, or wood.

Trigger 120 may be connected to a locking mechanism. The locking mechanism may releasably secure outer tube 140 to inner tube 150 to prevent longitudinal movement of inner tube 150 relative to outer tube 140. The description of FIGS. 2-9 discuss exemplary locking mechanisms according to various embodiments.

Handle 110 may be attached to an accessory, such as a gun rest 130, as shown in FIG. 1. Handle 110 may also be attached to other types of accessories, which may include gun mounts, microphone clips, cameras, camcorders, professional photography equipment, telescopes, surveyors' equipment, and any other type of equipment, accessory, or attachment capable of being attached to handle 110. In certain embodiments, the head itself may comprise an accessory (e.g., a camera, a gun mount, a telescope, a microphone clip, etc.) or any other type of attachment.

According to some embodiments, gun rest 130 may be v-shaped. Gun rest 130 may also be various other shapes. In various embodiments, gun rest 130 may be rotatable. Gun rest 130 may be shaped to allow a shooter to rest a barrel or other portion of a gun in gun rest 130 to help stabilize the gun while the shooter is shooting. In some embodiments, telescoping support stand 100 may include a gun mount instead of a gun rest. Gun rest 130 (or any other accessory or head) may include a hook that allows telescoping support stand 100 to be attached to clothing, a belt, or a pack for easy carrying.

Many other features of telescoping support stand 100 and other exemplary telescoping support stands are described in the following discussion of FIGS. 2-19. FIGS. 2-10 discuss, among other things, an air-exchange system for a telescoping support stand. The discussion corresponding to FIG. 11 focuses on an extended trigger feature of a telescoping support stand, and FIGS. 12-19 illustrate additional exemplary telescoping support stands and features.

Figure 2A:
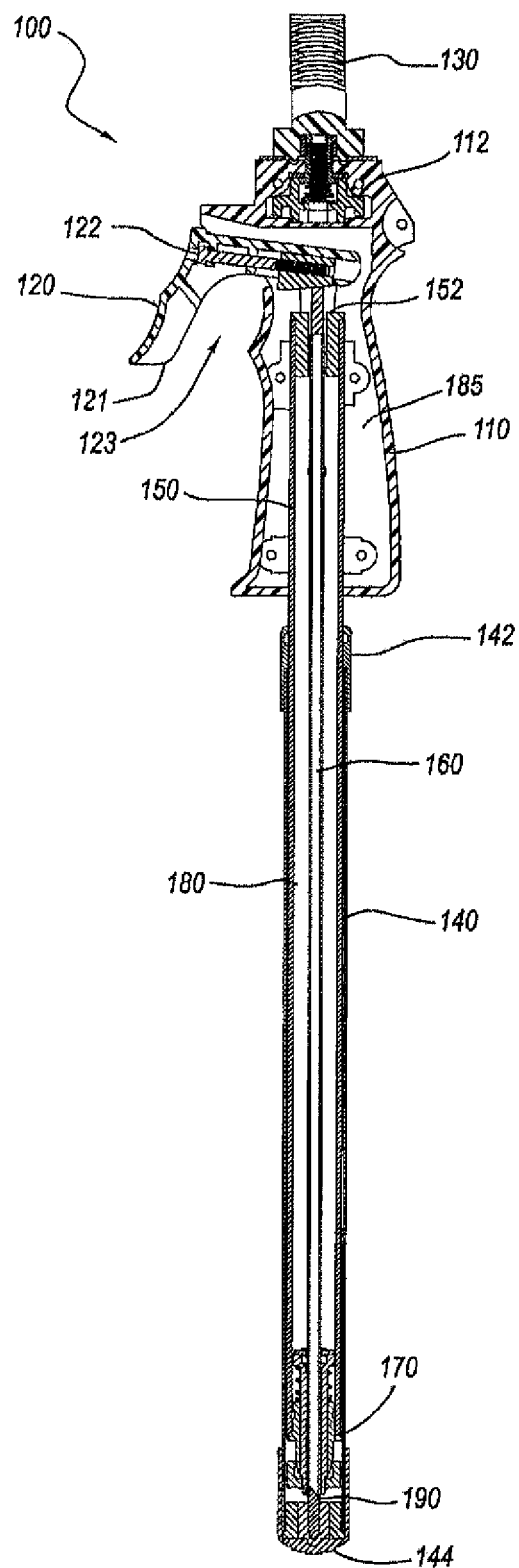
FIG. 2A is a cross-sectional side view of the telescoping support stand illustrated in FIG. 1 according to certain embodiments.

FIG. 2A is a cross-sectional side view of the exemplary telescoping support stand of FIG. 1. FIG. 2A illustrates three enclosed areas inside telescoping support stand 100, enclosed area 180, enclosed area 185, and enclosed area 190. Enclosed area 180 may be partially or completely within inner tube 150. As shown in FIG. 2A, enclosed area 180 may be enclosed on the sides by inner tube 150, on the top by a release rod guide 152, and on the bottom by a locking mechanism 170. Enclosed area 180 may also be enclosed on the top by handle 110. In certain embodiments, enclosed area 180 may be enclosed at the top by a head, a gun rest, or any other type of accessory. Enclosed area 185 may be partially or completely within handle 110. In some embodiments, enclosed area 185 is the empty space within handle 110. According to certain embodiments, the top end of enclosed area 180 is not sealed, and enclosed area 180 may open up into enclosed area 185. Enclosed area 190 may be partially or completely enclosed within outer tube 140. Enclosed area 190 may be enclosed on the sides by outer tube 140, on the bottom by an end cap 144, and on the top by locking mechanism 170. Instead of being enclosed by end cap 144, in some embodiments enclosed area 190 may be enclosed by outer tube 140 at the bottom.

Enclosed areas 180 and 190 may be completely or substantially air-tight. For example, end cap 144 may be sealed or attached to outer tube 140 such that little or no air can escape from enclosed area 190 through or around end cap 144. Release rod guide 160 may be secured at the top end of inner tube 150 such that little or no air can escape through the top of inner tube 150. When air is unable to quickly enter and exit enclosed areas 180 and 190, vacuum and dampening effects slow the ability of tele seeping support stand 100 to move between collapsed and expanded positions. In some embodiments, the bottom of enclosed area 190 and the top of enclosed area 180 may be referred to as substantially air-tight when, without any type of air exchange system, dampening and vacuum affects are present when the telescoping support stand is adjusted.

According to certain embodiments, locking mechanism 170 may divide enclosed area 180 from enclosed area 190. For example, locking mechanism 170 may be attached to an end of inner tube 150, as shown in FIG. 2A. Locking mechanism 170 may also be disposed within inner tube 150 at a location other than an end of inner tube 150. For example, inner tube 150 may include openings that allow portions of locking mechanism 170 to extend through inner tube 150 and contact outer tube 140. Locking mechanism 170 may be able to releasably secure inner tube 150 to outer tube 140 by pressing against an inside surface of outer tube 140. In certain embodiments, locking mechanism 170 may be attached to outer tube 140.

FIG. 2A also illustrates additional features of handle 110. The trigger 120 includes an inner curved, sloped or contoured inner surface which, in combination with handle 110, defines an open area for a person's hand, finger, or fingers. Handle 110, as shown in FIG. 2A, may include an accessory attachment member 112. Accessory attachment member 112 may include a threaded member for securing handle 110 to an attachment, such as gun rest 130. Accessory attachment member 112 may be rotated to screw a threaded member into an attachment. Handle 110 may also include an adjustment member 122 attached to trigger 120. Adjustment member 122 may allow a user to adjust the spacing between adjustment member 122 and a release rod 160. For example, if there is play in trigger 120 (e.g., there is a gap between adjustment member 122 and release rod 160) adjustment member 122 may be moved to take the play out of trigger 120.

When trigger 120 is pulled toward handle 110, adjustment member 122 may press down on release rod 160. As shown in FIG. 2A, release rod 160 may be attached to locking mechanism 170. Thus, release rod 160 may couple locking mechanism 170 to trigger 120, releasing locking mechanism 170 when trigger 120 is pulled toward handle 110. Thus, the height of telescoping support stand 100 may be adjusted while trigger 120 is pulled. When trigger 120 is released, locking mechanism 170 may secure inner tube 150 to outer tube 140 and prevent further height adjustment of telescoping support stand 100.

FIG. 2A also shows an end cap 142 below handle 110. End cap 142 may be attached to a top end of outer tube 140 and may serve multiple purposes. For example, end cap 142 may prevent inner tube 150 from being completely separated or pulled from outer tube 140. End cap 142 may also serve to substantially seal outer tube 140 to inner tube 150 to prevent water, dirt, or debris from entering outer tube 140, thus substantially preventing air from entering or exiting outer tube 140 through or around end cap 142.

Figure 2B:
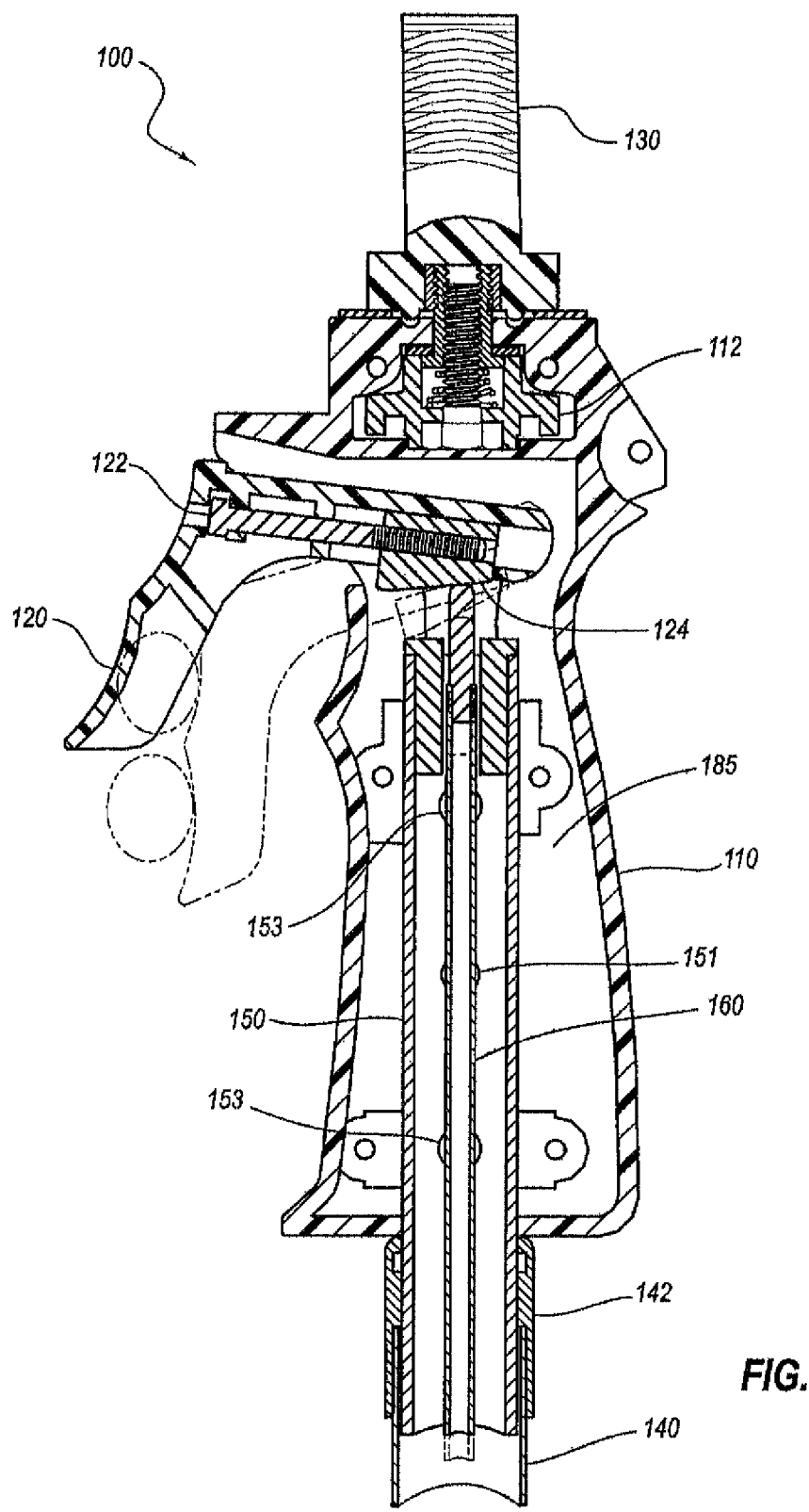
FIG. 2B is a cross-sectional side view of the telescoping support stand illustrated in FIG. 1 according to certain embodiments.

FIG. 2B is a cross-sectional diagram of handle 110. As shown in FIG. 2B, inner tube 150 may include openings 151 and 153. Opening 151 may be an air exchange aperture that allows air to flow between enclosed area 180 and enclosed area 185. Openings 153 may receive pegs extending from handle 110, allowing handle 110 to hold inner tube 150 in place. Handle 110 may also include an opening 121. Opening 121 may be under and/or above trigger 120. In some embodiments, opening 121 may also extend around the sides of trigger 120. Opening 121 may be an air exchange aperture allowing air to enter and exit enclosed area 185 (and thereby allowing air to enter an exit telescoping support stand 100.)

FIG. 2B also shows that adjustment member 122 may include a wedge-shaped member 124. When adjustment member 122 is turned counter-clockwise, wedge-shaped member 124 may move to the right and may take up slack between wedge-shaped member and release rod 160. When adjustment member 122 is turned clockwise, wedge-shaped member 124 may move to the left and reduce pressure on release rod 160.

Figure 2C:
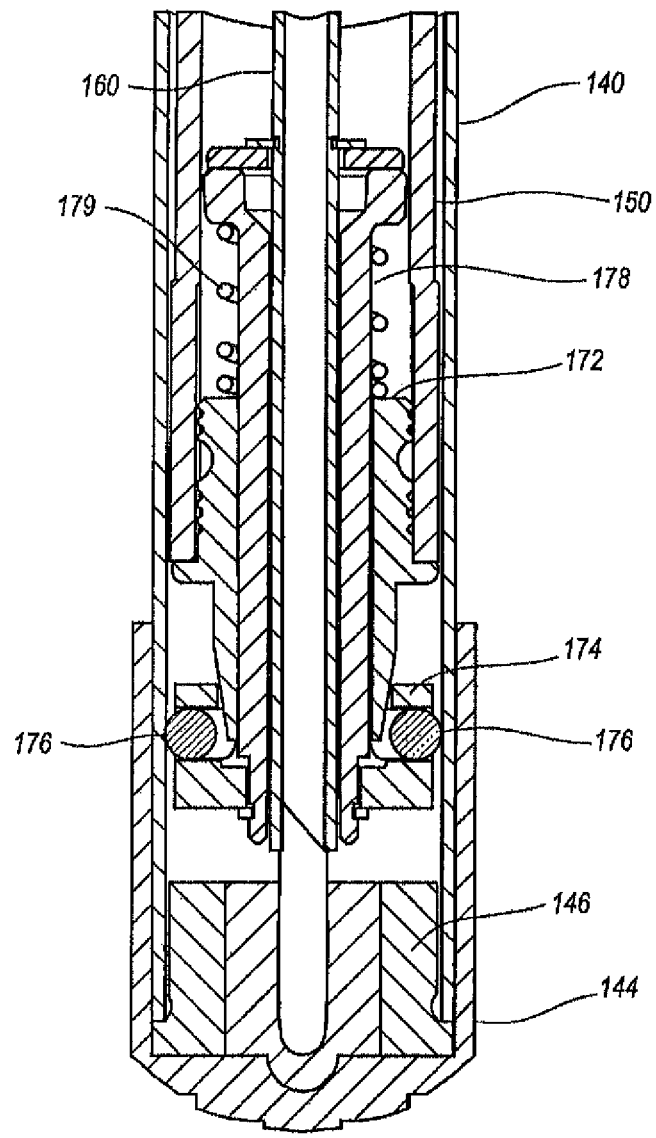
FIG. 2C is a cross-sectional side view of the telescoping support stand illustrated in FIG. 1 according to certain embodiments.

FIG. 2C is a cross-sectional diagram of a bottom portion of telescoping shooting stand 100. FIG. 2C shows that locking mechanism 170 may include a truncated-cone member 172, a bearing retainer 174, bearings 176, a tubular member 178, and a spring 179. FIG. 2C also shows end cap 144 and an accessory attachment member 146.

Figure 3A:
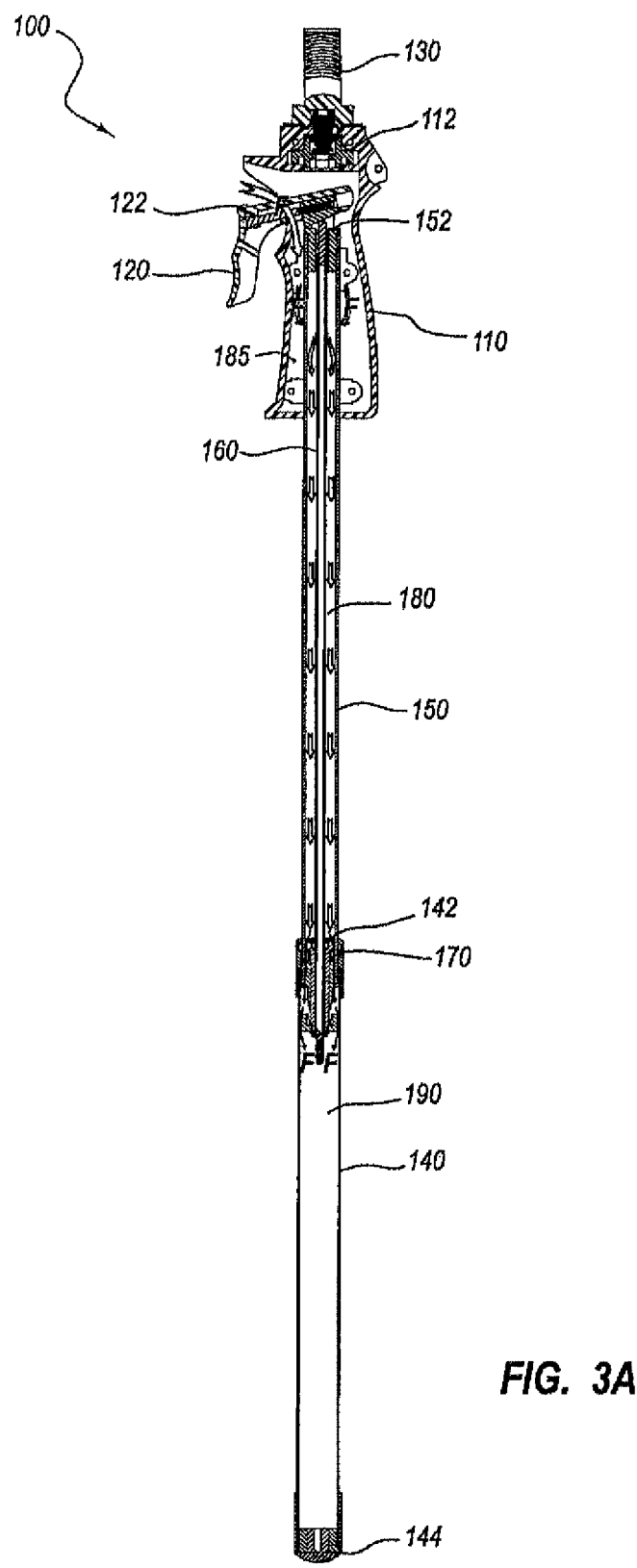
FIG. 3A is a cross-sectional side view of the telescoping support stand illustrated in FIG. 1 in an extended position according to certain embodiments.

FIG. 3A is a cross-sectional diagram of telescoping support stand 100 in an extended position. As shown in FIG. 3A, trigger 120 may be pulled towards handle 110 to release locking mechanism 170 and allow outer tube 140 to slide longitudinally relative to inner tube 150. The volume of enclosed area 190 may increase substantially when telescoping support stand 100 is extended. If enclosed area 190 is substantially air-tight, air will not be able to quickly enter enclosed area 190 when outer tube 140 is moved to an extended position. Even if some air is able to enter enclosed area 190 around end cap 144 or through locking mechanism 170, a vacuum effect may slow or inhibit movement of outer tube 140 to an extended position if air is not able to quickly enter and exit enclosed area 190. Thus, telescoping support stand 100 may include air exchange apertures that allow air to enter and exit enclosed area 190, thereby reducing or eliminating the vacuum and dampening affects caused when enclosed area 190 is substantially sealed.

FIG. 3A shows an air-flow path F, which illustrates air flow through air exchange apertures when outer tube 140 is being moved to an extended position. In other words, air-flow path F illustrates an example of how air may flow through air exchange apertures when the height of telescoping support stand 100 is increased. When telescoping support stand 100 is extended, the volume of enclosed area 190 increases and air may be pulled through a first air exchange aperture into enclosed area 185, through a second air exchange aperture into enclosed area 180, and through a third air exchange aperture into enclosed area 190. The first air exchange aperture may be an opening or other air inlet in handle 110. The second air exchange aperture may be an opening in inner tube 150 or an opening in or around release rod guide 152. The third air exchange aperture may be an opening in, around, or through locking mechanism 170. The first, second, and third air exchange apertures may serve to reduce or eliminate the vacuum effect caused when telescoping support stand 100 is substantially air-tight, and outer tube 140 may be able to move quickly (i.e., approximately one or two seconds or less, as compared to several seconds) to an extended position relative to inner tube 150. The vacuum effect may also be reduced by including only one or two of the first, second, and third air exchange apertures in telescoping support stand 100. And in some embodiments, more than three air exchange apertures may be included in telescoping support stand 100.

When telescoping support stand 100 is collapsed, the volume of enclosed area 190 decreases and air may be pushed out of telescoping support stand 100 through the first, second, and third air exchange apertures. Thus, the first, second, and third air exchange apertures may serve to reduce or eliminate the dampening effect caused when telescoping support stand 100 is substantially air-tight, and telescoping support stand 100 may be able to be quickly moved to a collapsed position. The dampening effect may also be reduced by including only one or two of the first, second, and third air exchange apertures in telescoping support stand 100.

Figure 3B:
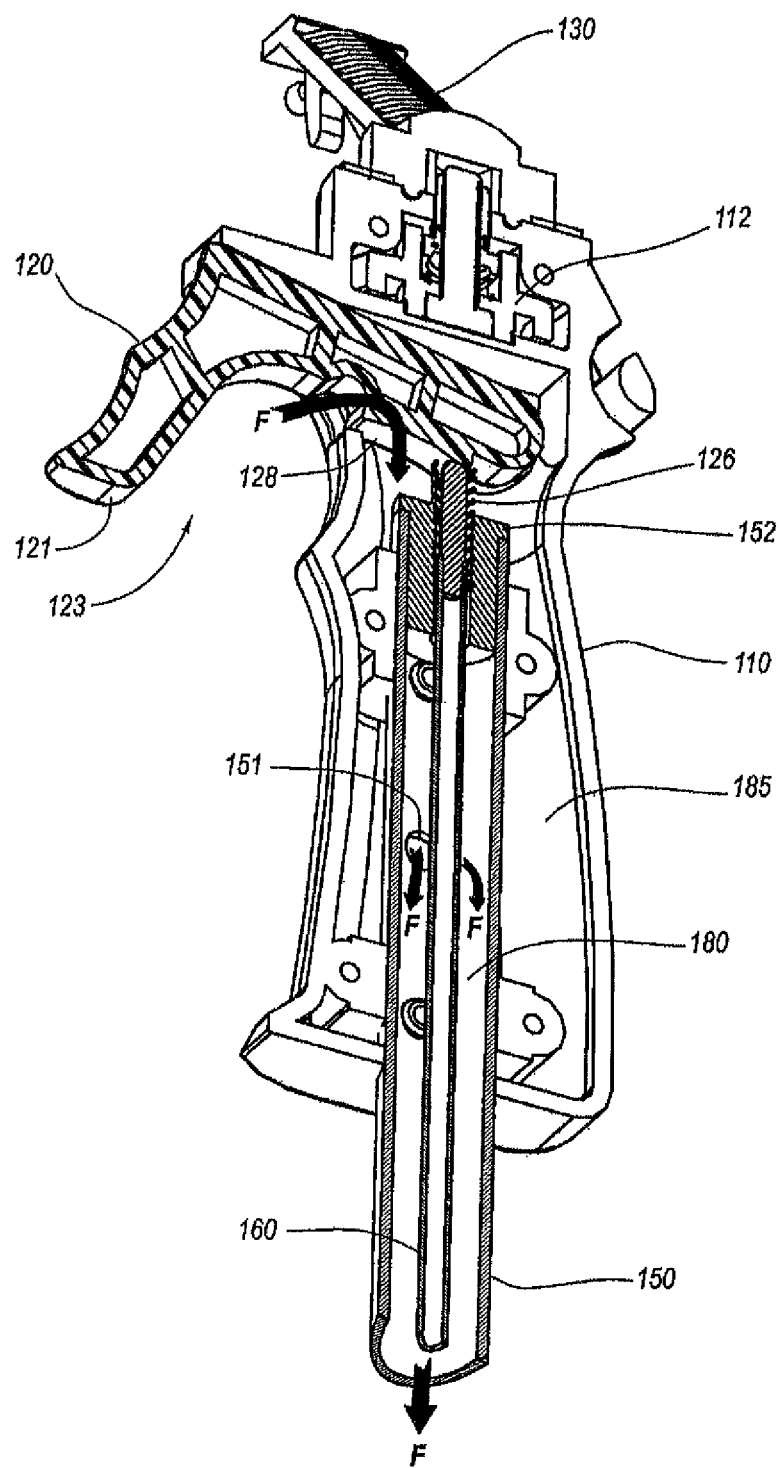
FIG. 3B is a perspective cross-sectional view of a handle of a telescoping support stand according to certain embodiments.

FIG. 3B is a perspective cross-sectional view of handle 100, and illustrates exemplary first and second air exchange apertures. Opening 128, which may allow air to flow around trigger 120 and enter enclosed area 185, may be the first air exchange aperture. Opening 151, which may allow air to flow between enclosed areas 180 and 185, may be the second air exchange aperture. Handle 110 may also include other air exchange apertures in addition to or instead of opening 128. FIG. 3B also illustrates another embodiment of trigger 120. Instead of having wedge-shaped member 124, trigger 120 may include a lower portion 128 that contacts release rod 160 directly. A spring 126 may be provided to bias trigger 120 in a first upward position and eliminate play in trigger 120. Thus, spring 126 may reduce or eliminate the need for adjustment member 122.

Figure 3C:
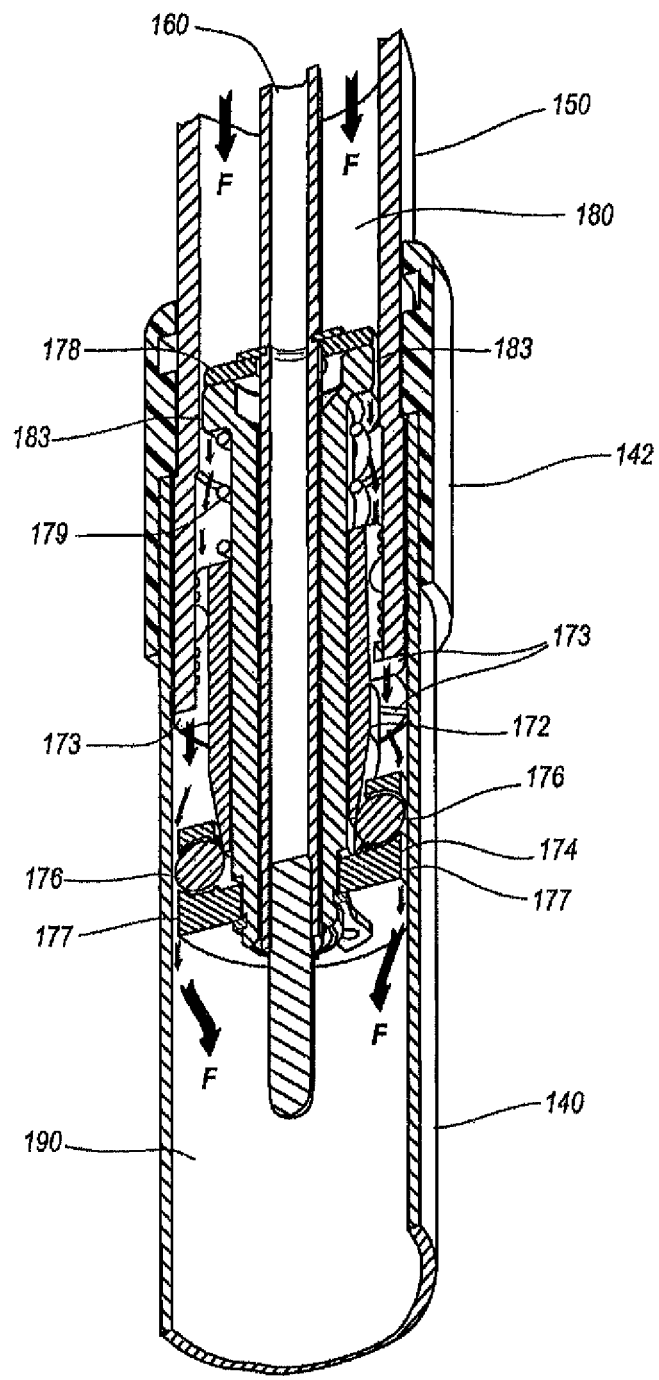
FIG. 3C is a perspective cross-sectional view of a locking mechanism of a telescoping support stand according to certain embodiments.

FIG. 3C is a perspective cross-sectional view of locking mechanism 170 with air exchange apertures that allow air to flow between enclosed area 180 and enclosed area 190. For example, a gap 183, which is between an upper portion tubular member 178 and inner tube 150, may allow air to flow past the upper portion of tubular member 178. Notches 173 in truncated cone member 172, may allow air to flow past truncated cone member 172. Notches 173 are also shown in FIGS. 4, 5, 6A, and 6B. A gap 177, which is between bearing retainer 174 and outer tube 140, may allow air to flow past bearing retainer 140 and into enclosed area 190. Thus, to flow between enclosed areas 180 to 190, air may flow through gap 183, notches 173, and gap 177.

While FIGS. 3A, 3B, and 3C show air flow in a downward direction (the direction air flows when telescoping support stand 100 is being extended), those of skill in the art will appreciate that air may also flow in the opposite (upward) direction through the air exchange apertures illustrated in FIGS. 3A, 3B, and 3C. Air may flow in an upward direction when telescoping support stand 100 is being collapsed.

FIGS. 4-10 illustrate various embodiments of air exchange apertures that may be included in telescoping support stands. According to certain embodiments, one of the air exchange apertures illustrated in FIGS. 4-10 may be included in a telescoping support stand without including any other air exchange apertures in the telescoping support stand. In some embodiments, any or all of the air exchange apertures illustrated in FIGS. 4-10 may be included together in a telescoping support stand.

Figure 4:
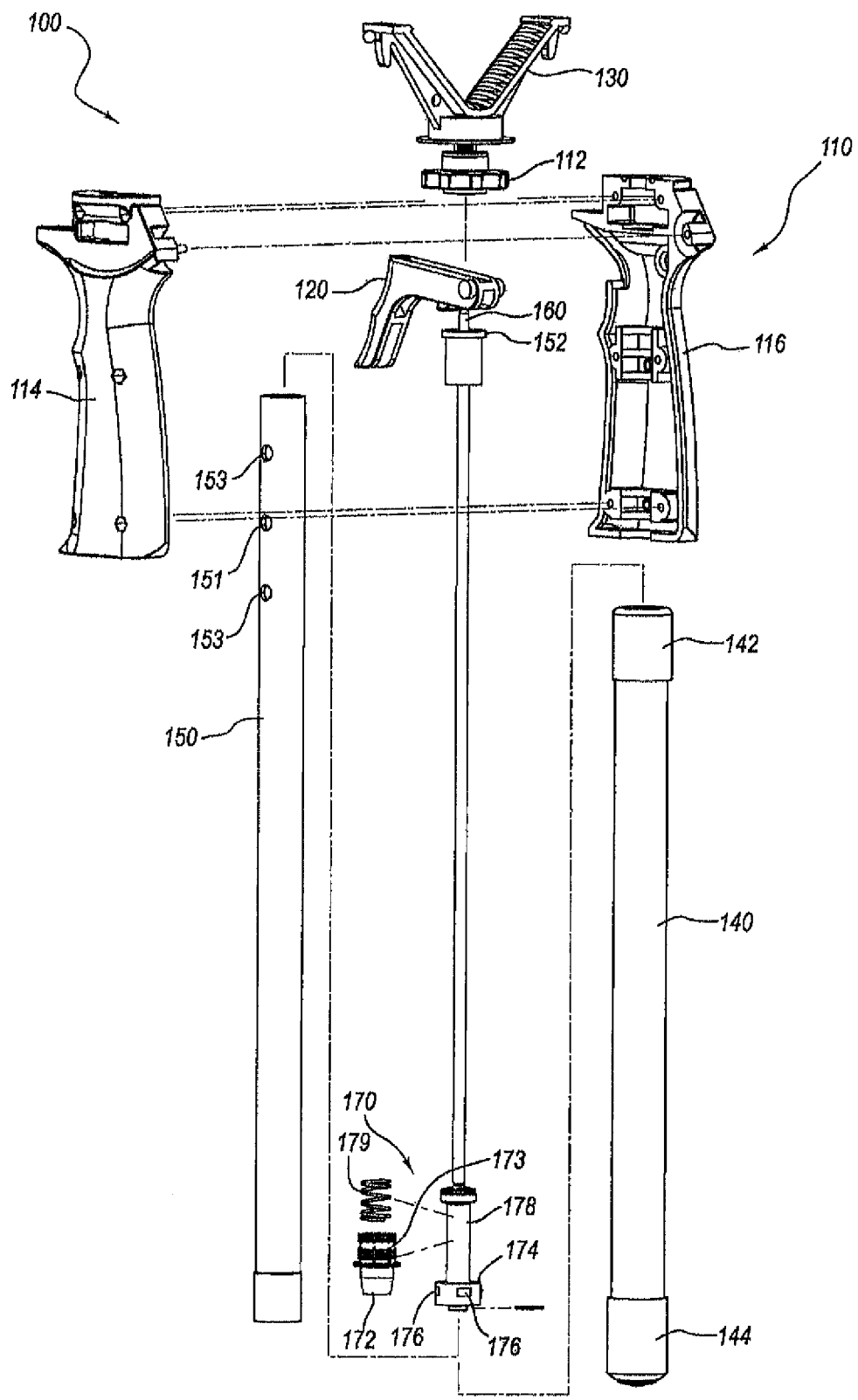
FIG. 4 is an exploded perspective view of the telescoping support stand illustrated in FIG. 1 according to certain embodiments.

FIG. 4 is an exploded perspective view of telescoping support stand 100. As shown in FIG. 4, handle 110 may be divided into a handle section 114 and a handle section 116. Handle sections 114 and 116 may be shaped to fit together to hold release rod guide 152, trigger 120, and accessory attachment member 112. Release rod guide 152 may be attached to a top end of inner tube 150 and may include an opening through which release rod 160 may pass. In some embodiments, release rod guide 152 may fit snugly within inner tube 150 and snugly around release rod 160, substantially preventing air from passing through the top end of inner tube 150. In other embodiments, release rod guide 152 may at least partially define air exchange apertures that allow air to enter and exit enclosed area 180 through or around release rod guide 152. For example, release rod guide 152 may be dimensioned to allow air to pass between release rod guide 152 and release rod 160, providing an air exchange aperture between release rod guide 152 and release rod 160 (i.e., an air exchange aperture partially defined by release rod guide 152 and partially defined by release rod 160). Release rod guide 152 may also include air exchange openings extending between enclosed area 180 and an area enclosed by handle 110. In some embodiments, release rod guide 152 may also function as a silencer, reducing noise from the movement of internal parts of telescoping support stand 100.

Inner tube 150 may include air exchange apertures. For example, opening 151, as previously mentioned, may be an air exchange aperture that allows air to enter and exit enclosed area 180. As shown in FIG. 4, opening 151 may be a circular opening in inner tube 150. Opening 151 may also be any other shape or size of air exchange aperture in inner tube 150. Inner tube 150 may also include additional openings 153. Openings 153 may receive pegs extending from handle sections 114 and 116 to secure handle sections 114 and 116 to inner tube 150. In certain embodiments, openings 153 may be large enough to allow air to pass between the posts and inner tube 150.

FIG. 4 also illustrates an exploded view of an exemplary locking mechanism 170. As previously mentioned, locking mechanism 170 may include truncated-cone member 172, bearing retainer 174, bearings 176, tubular member 178, and spring 179. Tubular member 178 may be a cylinder with a an opening through the middle. As shown in FIG. 4, the opening may receive release rod 160. In some embodiments, tubular member 178 may be attached to release rod 178 so that tubular member 178 will move when release rod 160 moves. Bearing retainer 174 may hold bearings 176 in place and may be attached to tubular member 178.

Truncated-cone member 172, in some embodiments, may be disposed around tubular member 178 such that a tapered portion of truncated-cone member 172 comes into contact with bearings 176. A top portion of truncated-cone member 172 may be threaded to allow truncated-cone member 172 to attach to inner tube 150. Thus, when release rod 160 moves tubular member 178 and bearing retainer 174 in a downward direction, truncated-cone member 172 may stay stationary relative to tubular member 178 and bearing retainer 174. Spring 179 may be positioned on top of or within truncated-cone member 172 and may bias tubular member 178 and bearing retainer 174 in a first position. In the first position, bearing retainer 174 holds bearings 176 against a top section of the tapered portion of truncated-cone member 172 such that truncated cone member 172 presses bearings 176 against an inside surface of outer tube 140. Thus, when bearing retainer 174 is in the first position, bearings 160 may prevent longitudinal movement of outer tube 140 relative to inner tube 150.

As previously mentioned, release rod 160 may press tubular member 178 and bearing retainer 174 downward to a second position. In the second position, a lower portion of the tapered section of truncated-cone member 172 allows bearings 176 to move away from the inside surface of outer tube 140. Thus, in the second position, bearings 176 may not be forced against the inside surface of outer tube 140, allowing longitudinal movement of outer tube 140 relative to inner tube 150. In other embodiments, bearing retainer 174 may be secured to inner tube 150, and truncated-cone member 172 may be attached to release rod 160. In such embodiments, the tapered portion of truncated-cone member 172 may be pointed towards handle 110. Trigger 120 may move truncated-cone member 172 in a downward direction to release bearings 176 and allow longitudinal movement of outer tube 140.

One of skill in the art will recognize various possible modifications and alternatives to exemplary locking mechanism 170. For example, bearing retainer 174 may contain any number of bearings. In some embodiments, bearing retainer 174 may include three or four bearings. In other embodiments, bearing retainer 174 may include just one or two bearings or many more than four bearings. According to certain embodiments, bearings 176 are made of metal. In other embodiments, bearings 176 are made of plastic, rubber, or any other suitable material. Furthermore, various types of locking mechanisms fall within the scope of embodiments described herein. For example, locking mechanism 170 may include detents that can be pressed into notches in the inside surface of outer tube 140. The description of FIG. 9 also mentions other types of locking mechanisms.

Figure 5:
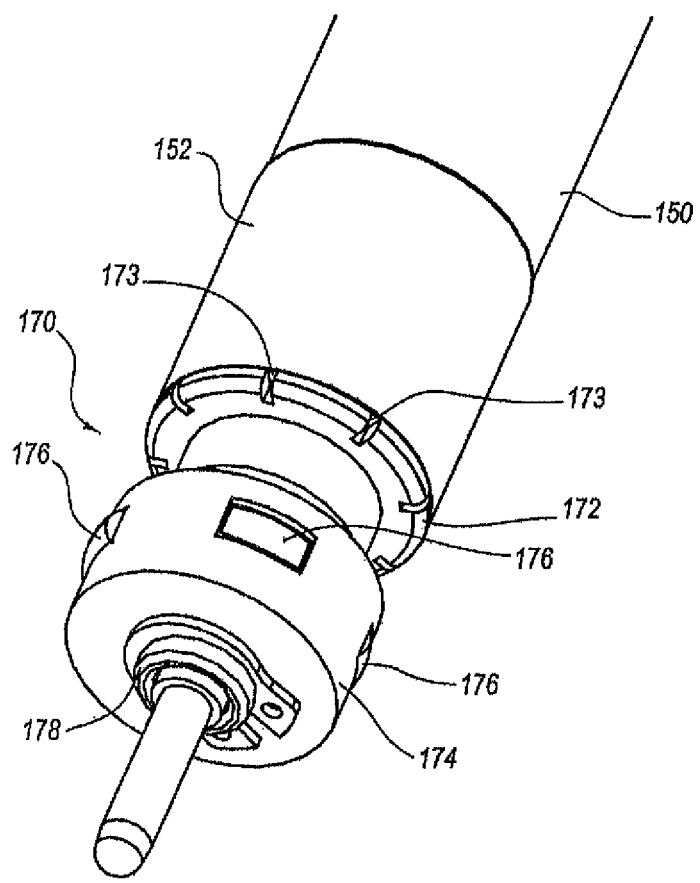
FIG. 5 is a perspective view of an exemplary locking mechanism attached to an inner tube according to certain embodiments.

FIGS. 5-8 illustrate various air exchange apertures within locking mechanism 170. FIG. 5 is a perspective view of locking mechanism 170 attached to inner tube 150. FIG. 5 shows bearing retainer 174 in the first position relative to truncated-cone member 172. In the first position, bearings 176 are pushed outward such that they protrude from bearing retainer 174. Accordingly, bearings 176 may press against the inside surface of outer tube 140 to secure outer tube 140 to inner tube 150, FIG. 5 also illustrates that truncated-cone member 172 may include notches 173. As previously mentioned, notches 173 may be air exchange apertures that allow air to pass between inner tube 150 and outer tube 140. In certain embodiments, notches 173 may extend between enclosed area 180 and enclosed area 190.

The configuration of locking mechanism 170 may help to keep locking mechanism 170 from slipping under a load. When a load is applied to gun rest 130, the load may push inner tube 150 in a downward direction. Locking mechanism 170, in a locked position, keeps inner tube 150 from sliding down into outer tube 140. In some previous devices, the locking mechanisms may start to slip if too much downward force is applied to gun rest 130. However, locking mechanism 170 may actually fasten more securely under a load. This is because downward pressure on inner tube 150 may force truncated-cone member 172, which may be attached to a bottom end of inner tube 150, further into bearing retainer 174. When truncated-cone member 172 is forced further into bearing retainer 174, truncated cone-member 172 causes bearings 176 to press more firmly against the inside surface of outer tube 140. Truncated-cone member 172, particularly when under a load, may apply a rotational force to bearings 176 in a direction opposite to the direction that bearings 176 rotate when moving downward through outer tube 140. This rotational force may also help to keep bearing-member 170 from slipping under a load.

Figure 6A:
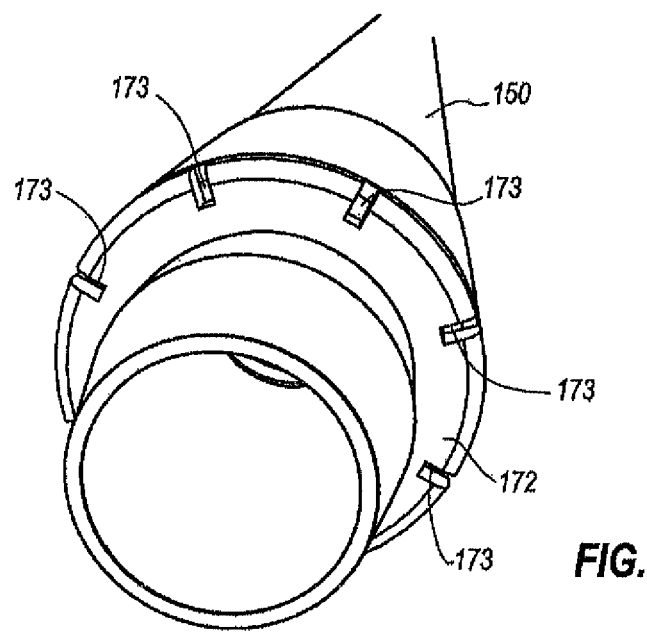
FIG. 6A is a perspective view of a truncated-cone member of the locking mechanism illustrated in FIG. 5 according to certain embodiments.
Figure 6B:
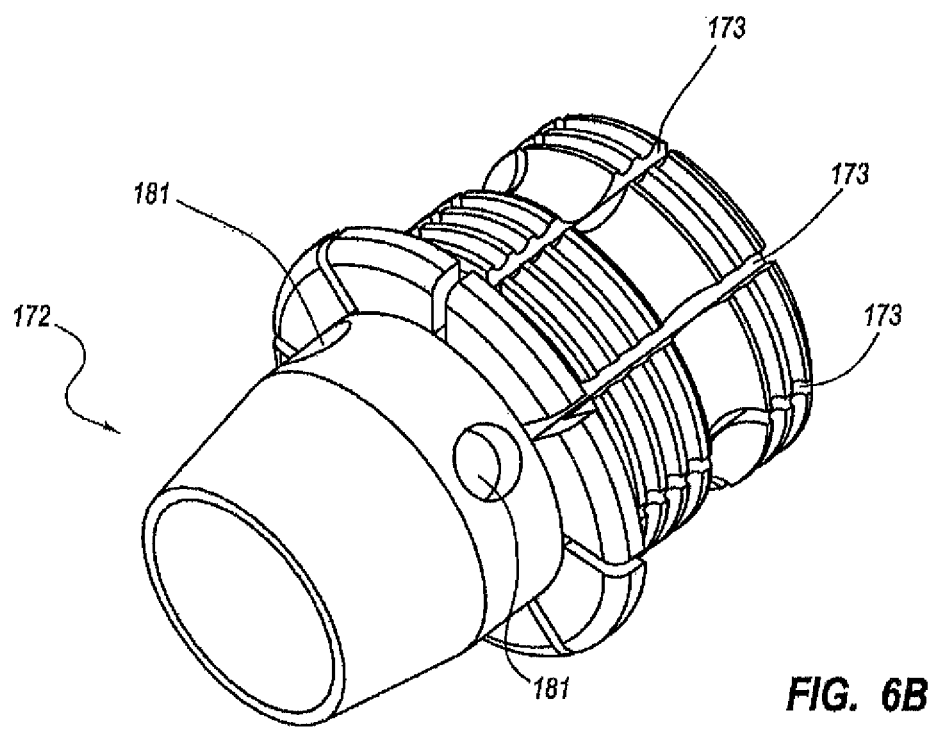
FIG. 6B is a perspective view of a truncated-cone member according to certain embodiments.

FIG. 6A is a perspective view of truncated-cone member 172 of locking mechanism 170. As shown in FIG. 6A, notches 173 may partially define air exchange apertures that allow air to flow in and out of inner tube 150. Inner tube 150 may also partially define these air exchange apertures. In some embodiments, truncated-cone member 172 may include openings 181 in addition to or instead of notches 173. While openings 181 are shown as circular openings, in certain embodiments, openings 181 may include slits, holes, pinholes, channels, or any other type of apertures that will allow air to flow between enclosed areas 180 and 190 through truncated-cone member 172. Openings 181 may also be included in any portion of truncated-cone member 172, including the tapered portion.

Figure 7:
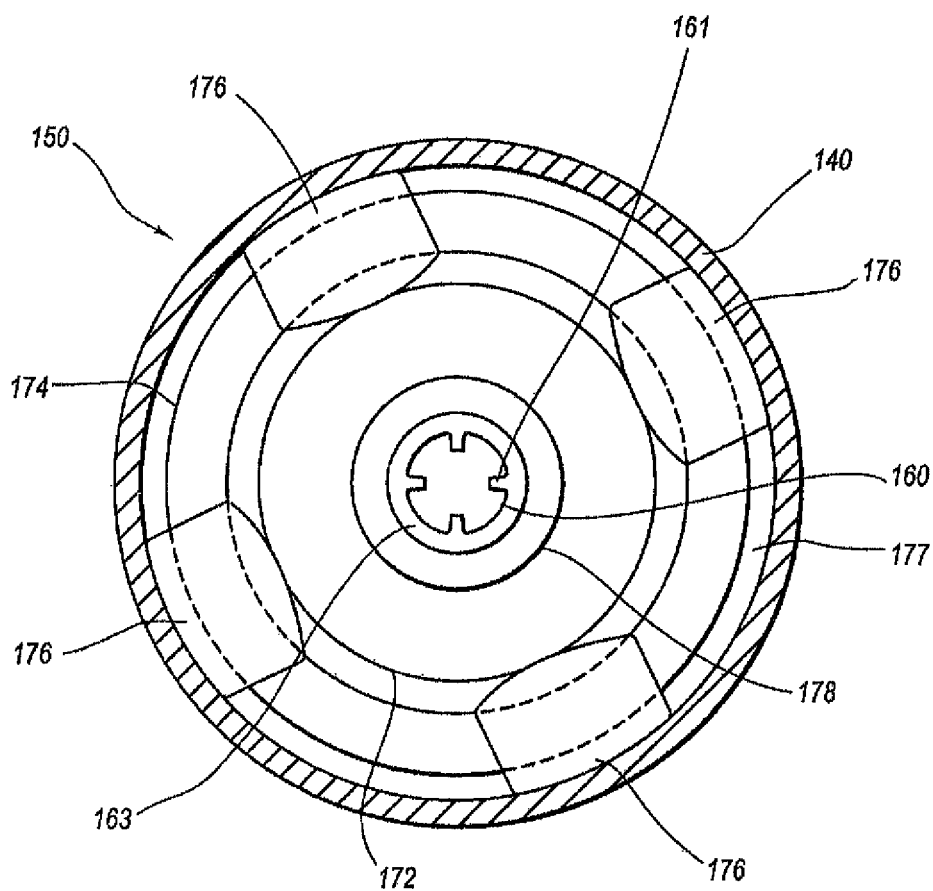
FIG. 7 is a cross-sectional top view of an exemplary locking mechanism according to certain embodiments.

FIG. 7 is a cross-sectional view of locking mechanism 170 in the first position. FIG. 7 shows truncated-cone member 172 may press bearings 176 against an inside surface of outer tube 140. Bearings 176 may be held in place by bearing retainer 174. In some embodiments, gap 177, shown between outer tube 140 and bearing retainer 174, may be an air exchange aperture that allows air to flow between enclosed areas 180 and 190. FIG. 7 also illustrates that gap 163, shown between release rod 160 and tubular member 178, may be an air exchange aperture. Release rod 160 may include notches 161 that extend along a portion or the entire length of release rod 160. Notches 161 and gap 163 may be air exchange apertures extending between enclosed areas 180 and 190. In some embodiments, notches 161 and gap 163 may both be included as air exchange apertures. In some embodiments, notches 161 and/or gap 163 may not be present. While four notches 161 are illustrated in FIG. 7, any number of notches may be included in release rod 160.

Figure 8:
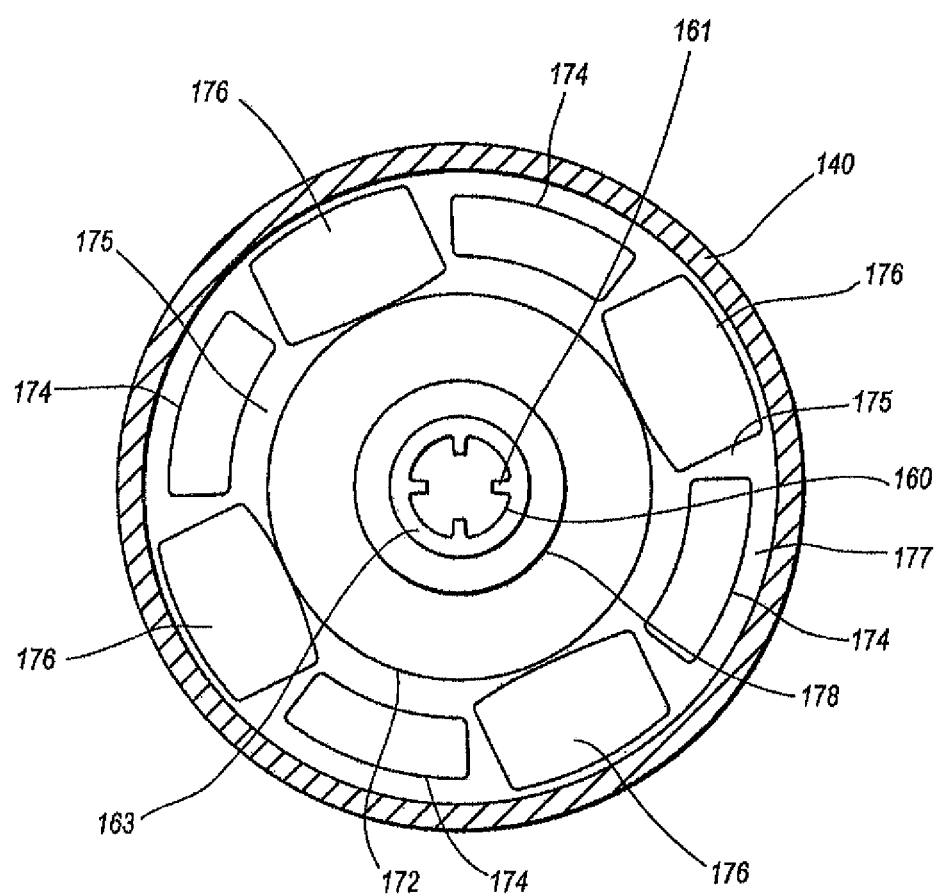
FIG. 8 is another cross-sectional top view of an exemplary locking mechanism according to certain embodiments.

FIG. 8 is a cross-sectional view of locking mechanism 170 in the second position. As illustrated, truncated-cone member 172 may allow bearings 176 to move away from the inner surface of outer tube 140. In some embodiments, locking mechanism 170 may include an air exchange aperture 175 between truncated-cone member 172 and bearing retainer 174. And in certain embodiments, air exchange aperture 175 may include gaps between bearing retainer 174 and bearings 176. Air exchange aperture 175 may allow air to flow around bearings 176 and through locking mechanism 170, thereby allowing air exchange between enclosed areas 180 and 190.

According to various embodiments, telescoping support stand 100 may include internal air exchange apertures and may also be substantially sealed such that water, dirt, and other debris cannot easily enter enclosed areas 180 and 190. Thus, telescoping support stand 100 may be both rugged and quickly adjustable.

Figure 9:
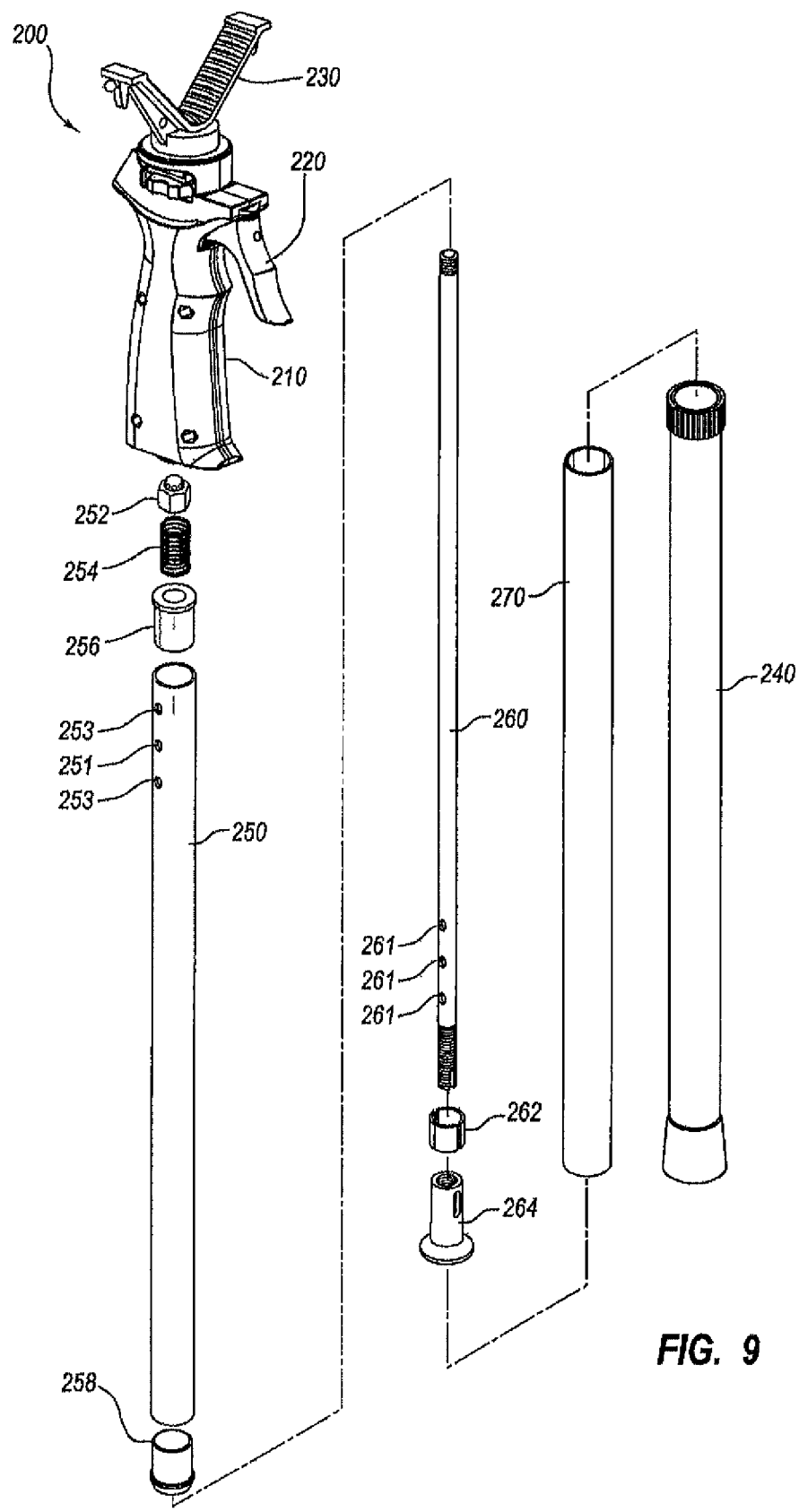
FIG. 9 is an exploded side view of an exemplary telescoping support stand according to certain embodiments.

FIG. 9 is an exploded side view of an exemplary telescoping support stand 200. Telescoping support stand 200 may include a handle 210, a trigger 220, and a rest 230. Rest 230 may comprise a gun rest, a microphone clip, a camera mount, a telescope mount, a binocular spotting scope mount, a binocular mount, a surveyor level mount, etc. Telescoping support stand 200 may also include a first tube 250, a second tube 270, and a third tube 240. First tube 250 may partially define a first enclosed area, second tube 270 may partially define a second enclosed area, and third tube 240 may partially define a third enclosed area. First tube 250 may be slidable within second tube 270, and second tube 270 may be slidable within third tube 240. According to some embodiments, telescoping support stand 200 may include two tubes or more than three tubes. Similarly, telescoping support stand 100 may also include three or more tubes.

A release rod 260 may be attached to a crown nut 252, or to any other attachment member, to hold release rod 260 inside of handle 210. An end cap 256 may be attached to a top end of first tube 250, and a spring 254 may be disposed around release rod 260. Spring 254 may sit on end cap 256 and press against crown nut 252 to bias release rod 260 in a first position. In certain embodiments, a top portion of end cap 256 may be recessed and spring 254 may sit within end cap 256. Release rod 260 may be attached to a male truncated-cone member 264, and a locking ring 262 may be disposed around male truncated-cone member 264 and a female truncated cone-member 258. Female truncated-cone member 258 may be attached to or formed in a bottom portion of first tube 250. In the first position, release rod 260 may pull male truncated-cone member 264 towards or into female truncated-cone member 258 to force locking ring 262 to expand.

When locking ring 262 expands, it may press against an inside surface of second tube 270. Thus, locking ring 262 may prevent longitudinal movement of second tube 270 relative to first tube 250 when release rod 260 and male truncated-cone member 264 are in the first position. In some embodiments, locking mechanism 270 may include rubber or plastic rings or pads instead of locking ring 262.

When trigger 220 is pulled, it may press down against crown nut 252 to force release rod 260 and male truncated-cone member 264 into a second position. In the second position, male truncated-cone member 264 may allow locking ring 262 to contract and release second tube 270, allowing longitudinal movement of second tube 270 relative to first tube 250. In some embodiments, a second locking ring may be disposed around a second set of male and female truncated-cone members, and the second locking ring may releasably secure second tube 270 to third tube 240.

Release rod 260 may be hollow and may include openings 261. Openings 261 may be air exchange apertures that allow air to flow between the first enclosed area and the inside of release rod 260. Release rod 260 may also be open at a top end to allow air to flow between release rod 260 and an area enclosed by handle 210. Release rod 260 may also be open at a bottom end to allow air to flow between the second enclosed area and the area enclosed by handle 210. In other words, air may flow between the first enclosed area and the second enclosed area through release rod 260. Air may also flow between the first enclosed area and the area enclosed by handle 210 through release rod 260. And in some embodiments, air may flow between the second enclosed area and the area enclosed by handle 210 through release rod 260. Thus, the hollow region within release rod 260 may comprise an air exchange aperture.

Figure 10:
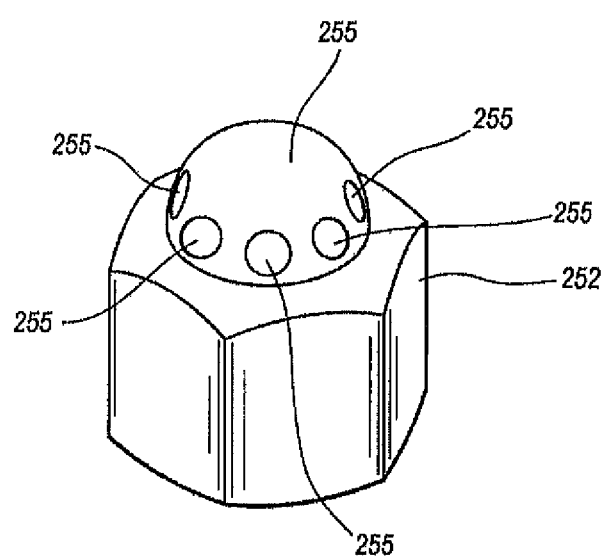
FIG. 10 is a perspective view of an exemplary crown nut according to certain embodiments.

First tube 250 may include openings 251 and 253. Opening 251 may be an air exchange aperture that allows air to flow between the first enclosed area and the area enclosed by handle 210. Openings 253 may receive posts extending from handle 210 to secure handle 210 to first tube 250. Openings 253 may be large enough to allow air to pass between the posts and first tube 250. Crown nut 252 may also include openings 255, as illustrated in FIG. 10. Openings 255 may allow air to enter and exit the top end of release rod 260. In other words, openings 255 may be air exchange apertures that allow air to flow between the area enclosed by handle 110 and the hollow area within release rod 260.

The air exchange apertures described herein may be openings, slits, holes, pinholes, channels, gaps, or any other type of apertures that will allow air to enter and exit an enclosed area. In some embodiments, a telescoping support stand may include a single air exchange aperture. In other embodiments, a telescoping support stand may include numerous air exchange apertures. As used herein, the term air exchange aperture may refer to a single aperture or multiple apertures that allow air to flow between enclosed areas.

Figure 11:
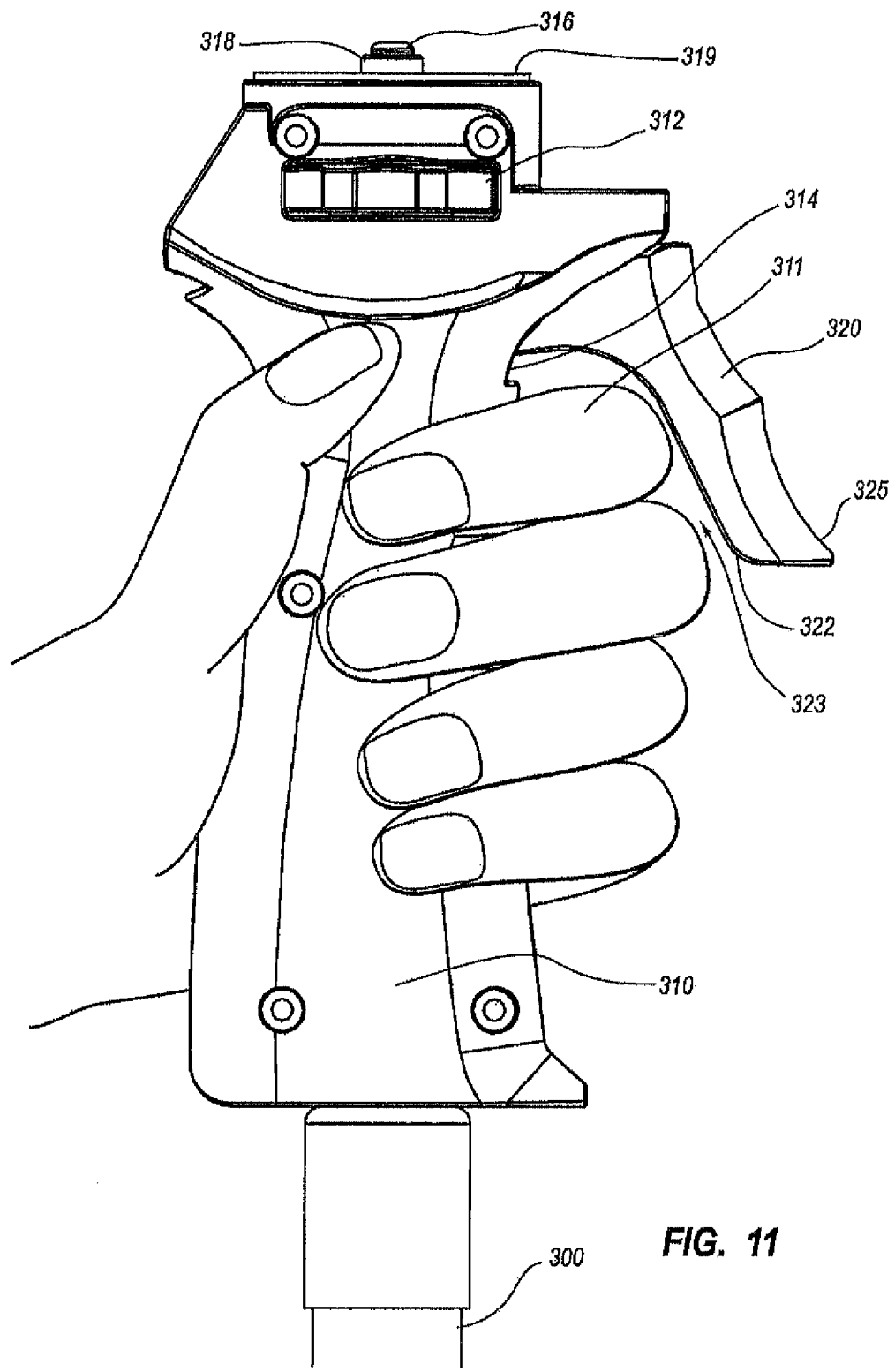
FIG. 11 is a side view of an exemplary handle of a telescoping support stand according to certain embodiments.

FIG. 11 is a side view of a handle 310 on a telescoping support stand 300 according to certain embodiments. Handle 310 includes a trigger with an inside surface 322 facing an outside surface 314 of handle 310 to define an opening therebetween. Inside surface 322 may be curved, sloped, or contoured to facilitate and direct a person's hand into the opening 323 and avoid catching the front surface 325 of the trigger 320. Trigger 320 may be dimensioned to allow a user's hand, finger, or fingers to easily slide into opening 323 and fit comfortably between outside surface 314 of handle 310 and inside surface 322 of trigger 320. The configuration of handle 310 allows the support stand to be carried either by itself of with an accessory (e.g., a camera, spotting scope, binoculars, etc.) attached to the support stand while minimizing the risk that the trigger 120 will accidentally be deployed. Space 323 may, in one embodiment, have a dimension of approximately 1¼ inches at its widest, open end and a dimension of approximately ½ inch at a location corresponding to an index finger of a person holding the support stand. FIG. 11 illustrates a user's finger 311 between outside surface 314 and inside surface 322. The configuration of handle 310 and trigger 320 may allow a user to quickly slide his or her hand up the handle and into opening 323 to firmly grasp handle 310 without the risk of accidentally pulling trigger 320.

Handle 310 also includes an accessory attachment member 312, which contains an inner screw 316 and an outer screw 318. Outer screw 318 may be spring-loaded, which allows outer screw 318 to be pressed down in order to expose the threads of inner screw 316. If an attachment is configured to receive outer screw 318, the attachment may simply screw onto outer screw 318. If an attachment is configured to receive inner screw 316, outer screw 318 may be pressed down, exposing the threads of inner screw 316.

Handle 310 may have a flat top portion 319 where an attachment may be connected. Top portion 319 may include a rubber pad that helps grip accessories. Top portion 319 may also include locking notches that accept locking beads from an accessory, thereby preventing the accessory from rotating.

Figure 12:
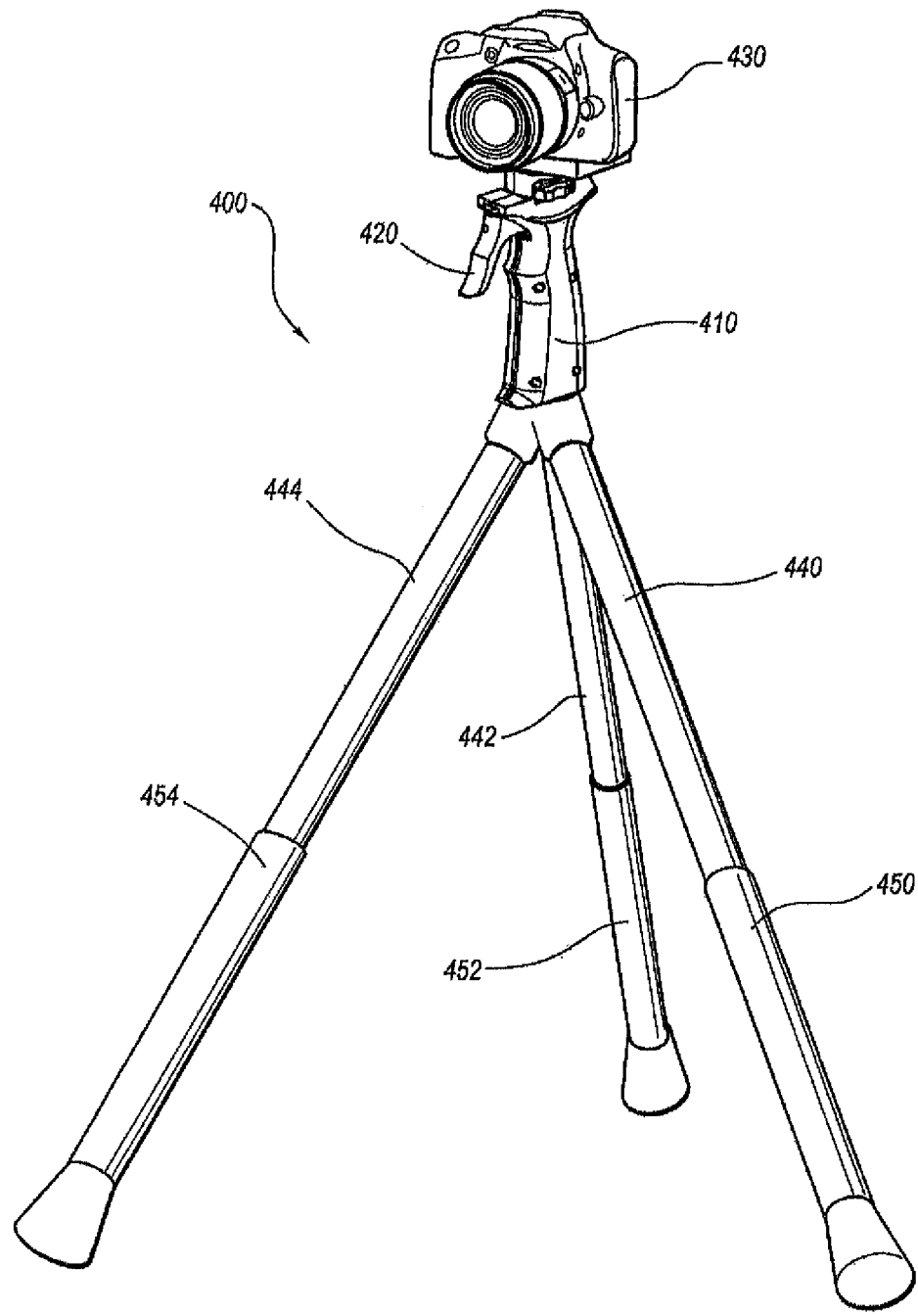
FIG. 12 is a perspective view of an exemplary telescoping support stand with three legs according to certain embodiments.

FIG. 12 illustrates a telescoping support stand 400 with three legs. A first leg may include an inner tube 440 and an outer tube 450. A second leg may include an inner tube 442 and an outer tube 452. A third leg may include an inner tube 444 and an outer tube 454. Each inner tube 440, 442, and 444 may include a locking mechanism for preventing longitudinal movement of a respective outer tube 450, 452, and 454. Telescoping support stand 400 may also include a handle 410 with a trigger 420. Trigger 420 may be coupled to the locking mechanisms in each of the legs and may be able to release simultaneously each of the locking mechanisms, thereby allowing simultaneous adjustment of each of the three legs. Alternatively, a separate handle 410/trigger 420 mechanism may be attached to each telescoping leg to accomplish the leg adjustments. A camera 430 may be attached to the top of handle 410. In some embodiments, telescoping support stand 400 may include 1 or 2 legs or more than 3 legs.

Figure 13:
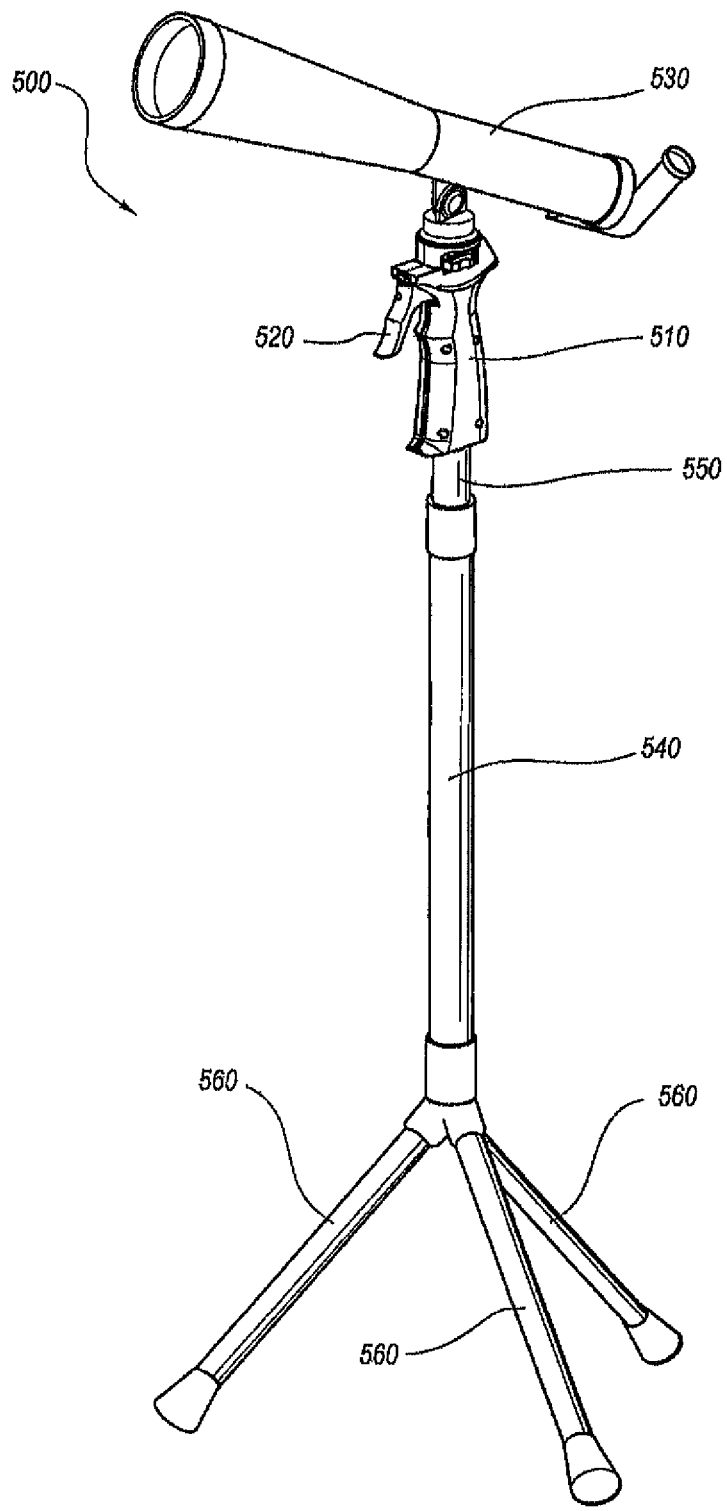
FIG. 13 is a perspective view of an exemplary telescoping support stand with a tripod base according to certain embodiments.

FIG. 13 illustrates telescoping support stand 500 with a tripod base. The tripod base includes three legs 560 attached to an outer tube 540. Outer tube 540 receives inner tube 550, which is attached to a handle 510. A telescope or spotting scope 530 may be attached to handle 510. Handle 510 includes a trigger 520 for releasing a locking mechanism attached to inner tube 550. When trigger 520 is pulled, the locking mechanism is released and a user may adjust the height of telescoping support stand 500. When trigger 520 is released, the locking mechanism may secure inner tube 550 to outer tube 540 and prevent further height adjustment.

Figure 14A:
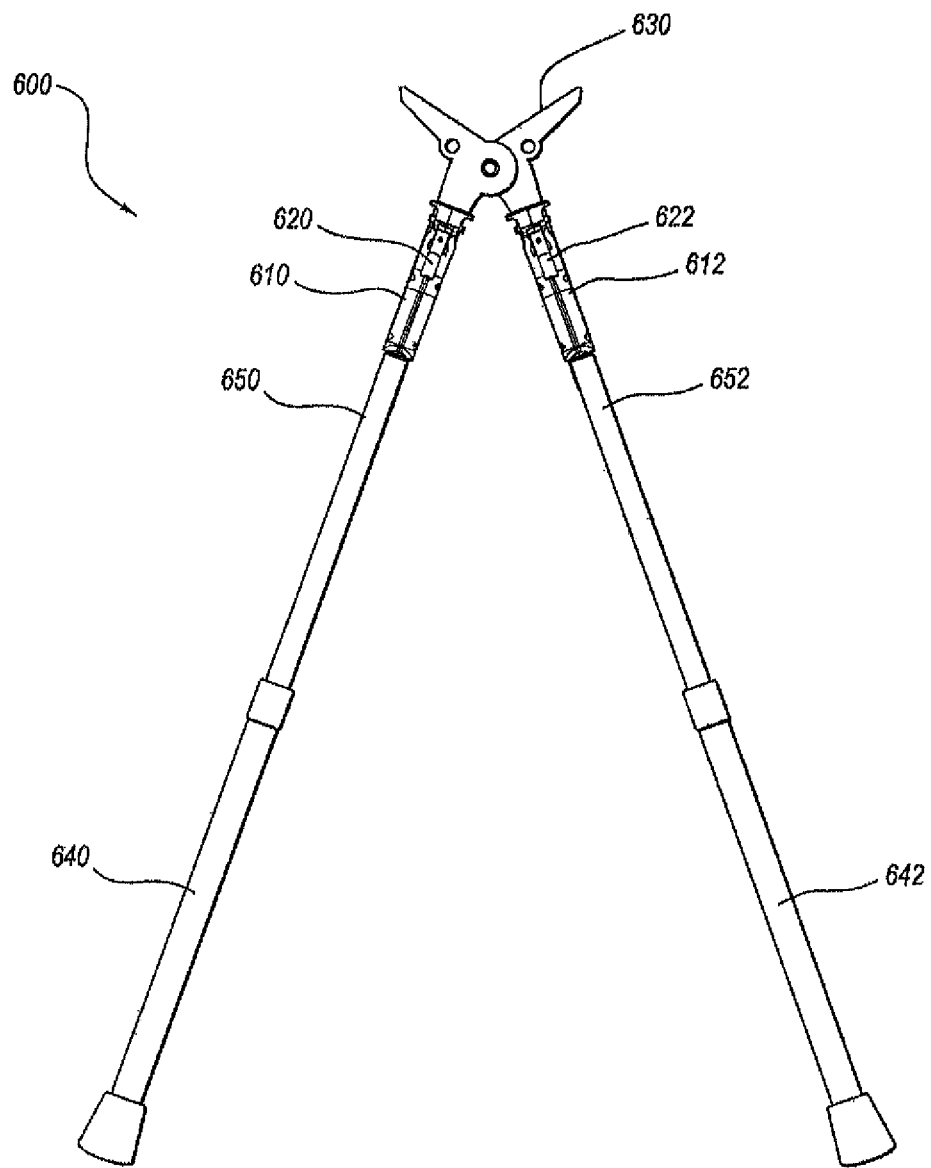
FIG. 14A is a perspective view of an exemplary bipod telescoping support stand according to certain embodiments.
Figure 14B:
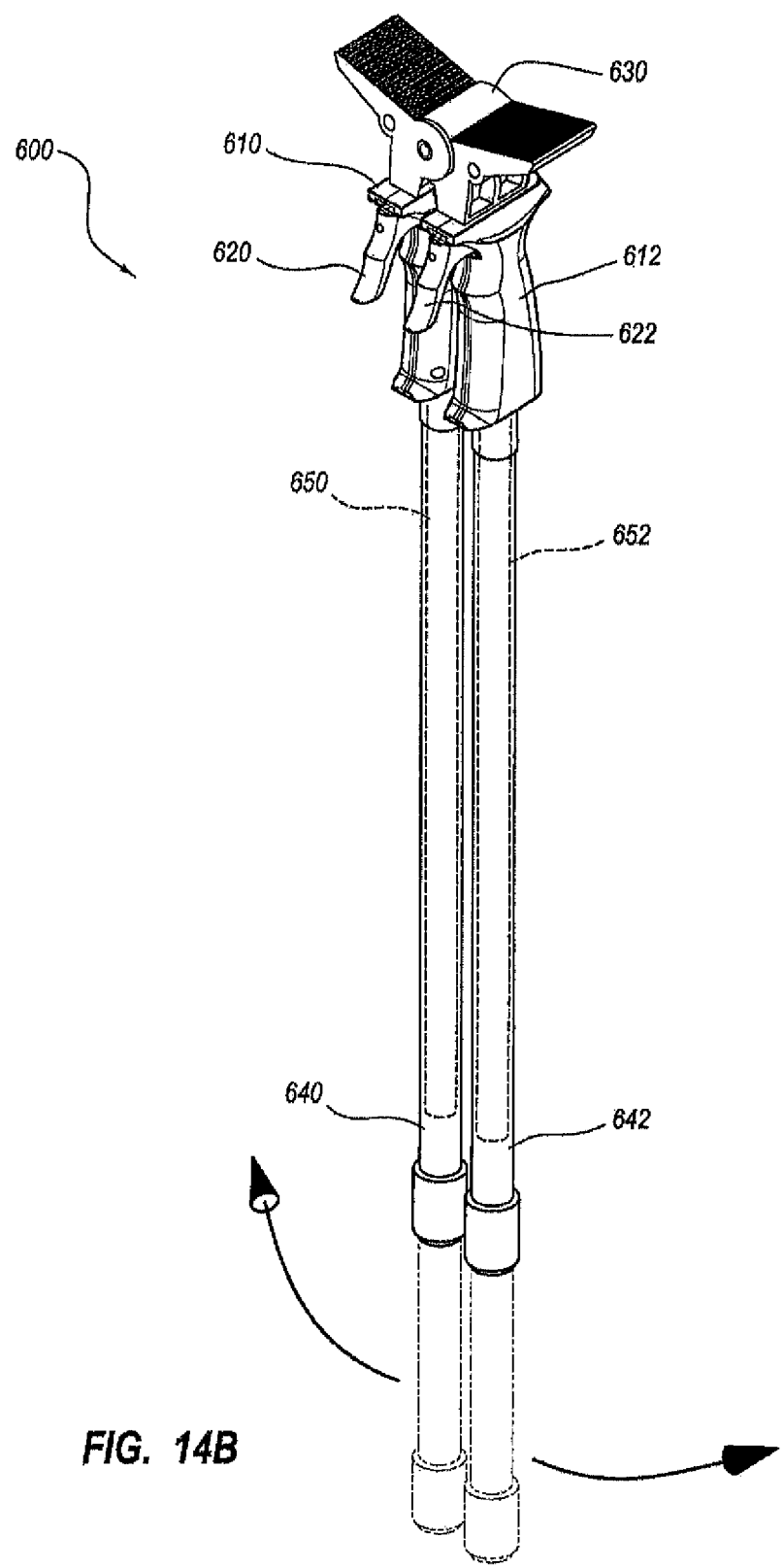
FIG. 14B is a perspective view of the exemplary bipod telescoping support stand illustrated in FIG. 14A.

FIG. 14A illustrates a bipod telescoping support stand 600. Bipod telescoping support stand 600 includes two legs attached to a gun rest 630. A first leg includes an outer tube 640, an inner tube 650, a handle 610, and a trigger 620. A second leg includes an outer tube 642, an inner tube 652, a handle 612, and a trigger 622. The first leg may be adjusted by pulling trigger 620, and the second leg may be adjusted by pulling trigger 622. FIG. 14B illustrated telescoping support stand 600 with the first and second legs in collapsed positions.

Figure 15:
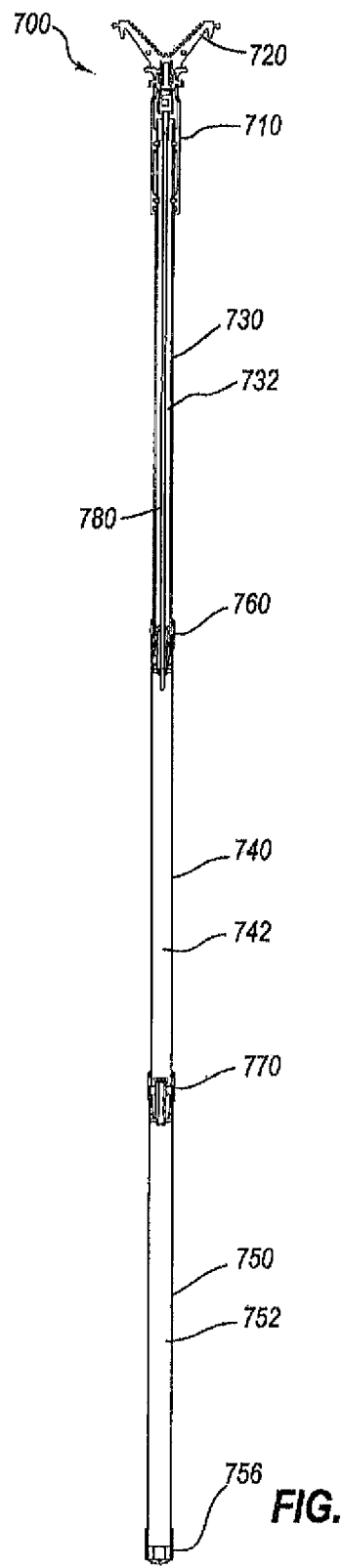
FIG. 15 is a cross-sectional side view of an exemplary telescoping support stand with three tubes according to certain embodiments.
Figure 16:
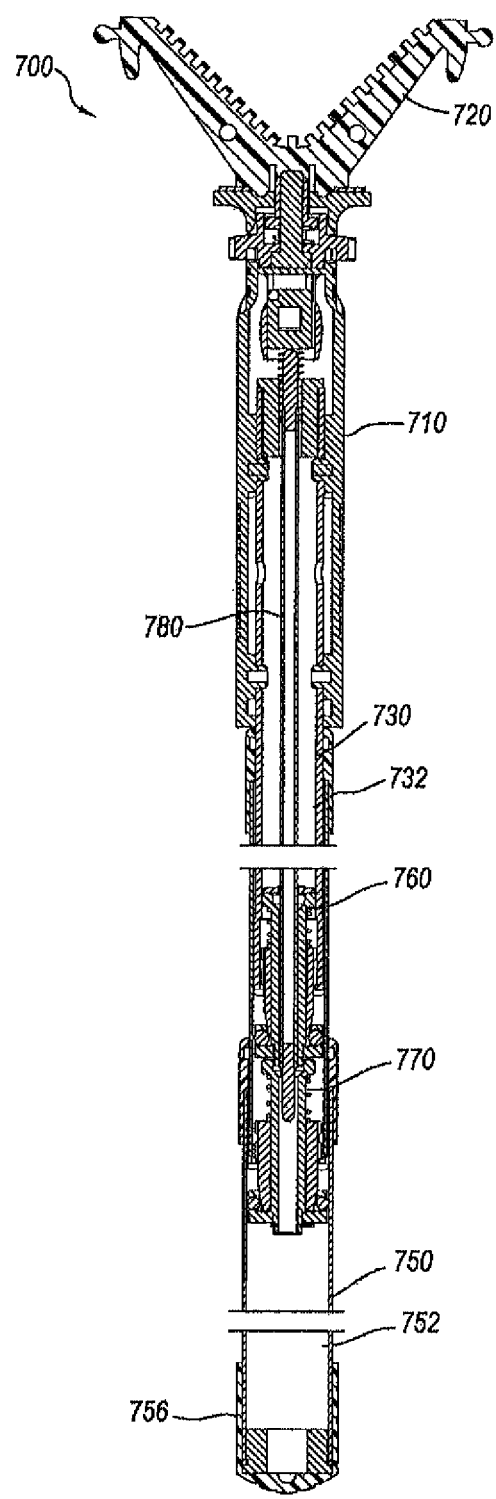
FIG. 16 is a cross-sectional side view of the telescoping support stand of FIG. 15 according to certain embodiments.

FIG. 15 is a cross-sectional side view of an exemplary mono-pod telescoping support stand 700 with three tubes. Telescoping support stand 700 may include a first tube 730, a second tube 740, and a third tube 750. An end cap 756 may be attached to a bottom end of third tube 750. FIG. 15 also illustrates an enclosed area 732 within first tube 730, an enclosed area 742 within second tube 740, and an enclosed area 752 within third tube 750. A handle 710 may be attached to a top end of first tube 730, and a gun rest 720 may be attached to handle 710. A first locking mechanism 760 may be attached to a bottom end of first tube 730, and a second locking mechanism 770 may be attached to a bottom end of second tube 740. First locking mechanism 760 may prevent longitudinal movement of second tube 740 relative to first tube 730, and a second locking mechanism 770 may prevent longitudinal movement of third tube 750 relative to second tube 740. A trigger (not shown) may press against a release rod 780 to release locking mechanism 760, allowing longitudinal movement of second tube 740 relative to first tube 730. FIG. 16 shows that first tube 730 may slide into second tube 740 until locking mechanism 760 touches locking mechanism 770.

FIG. 17 is a cross-sectional side view of first locking mechanism 760 in contact with second locking mechanism 770. First locking mechanism 760 may include a truncated-cone member 762, a bearing retainer 764, bearings 766, a tubular member 768, and a spring 769. Second locking mechanism 770 may include a truncated-cone member 772, a bearing retainer 774, bearings 776, a tubular member 778, and a spring 779.

As shown in FIG. 18, first locking mechanism 760 may be released, and a bottom portion of first locking mechanism 760 may press tubular member 778 in a downward direction. When locking mechanism 760 presses tubular member 778 down, bearing retainer 774 will also move in a downward direction and allow bearings 776 to move away from an inner surface of third tube 750. This may allow second tube 740 to collapse into third tube 750. Thus, to release first locking mechanism 760, a user may pull the trigger to cause release rod 780 to press tubular member 768 and bearing retainer 764 in a downward direction. To release second locking mechanism 770, a user may hold down the trigger and push first tube 730 into second tube 740 until locking mechanism 760 presses against locking mechanism 770. The downward force applied by the user may cause locking mechanism 760 to press down against locking mechanism 770, thereby releasing locking mechanism 770 and allowing second tube 740 to slide within third tube 750.

When a user desires to increase the height of telescoping support stand 700, the user may pull the trigger, which may release locking mechanism 760. However, pulling the trigger may not release locking mechanism 770 since locking mechanism 770 is not attached to release rod 780. Locking mechanism 770 may be adapted to allow tube 750 to move to an expanded position relative to tube 740 even though locking mechanism 770 is not attached to a release device. A user may be able to pull third tube 750 to an extended position because a force that pulls third tube 750 away from second tube 740 may pull bearing retainer 774 in a downward direction relative to truncated-cone member 772. This movement of bearing retainer 774 may relax the pressure that bearings 776 apply to the inside surface of third tube 750, allowing third tube 750 to move relative to second tube 740. Thus, locking mechanism 770 may be released by pulling 750 into an expanded position relative to second tube 740. In some embodiments, locking mechanism 760 may be released either by pulling the trigger or by pulling second tube 740 into an expanded position relative to first tube 730.

Telescoping support stand 700 may include air exchange apertures or passageways that allow air to flow between enclosed areas 732, 742, and 752. For example, locking mechanism 760 may include air exchange apertures or passageways that allow air to flow between enclosed areas 732 and 742. Locking mechanism 770 may include air exchange apertures that allow air to flow between enclosed areas 742 and 752. First tube 730 may include air exchange apertures that allow air to flow from enclosed area 732 into an area enclosed by handle 710, and handle 710 may include air exchange apertures that allow air to enter and exit handle 710. Accordingly, air may be able to flow from enclosed area 752 to enclosed area 742, from enclosed area 742 to enclosed area 732, from enclosed area 732 into handle 710, and then may exit telescoping support stand through handle 710.

Figure 19:
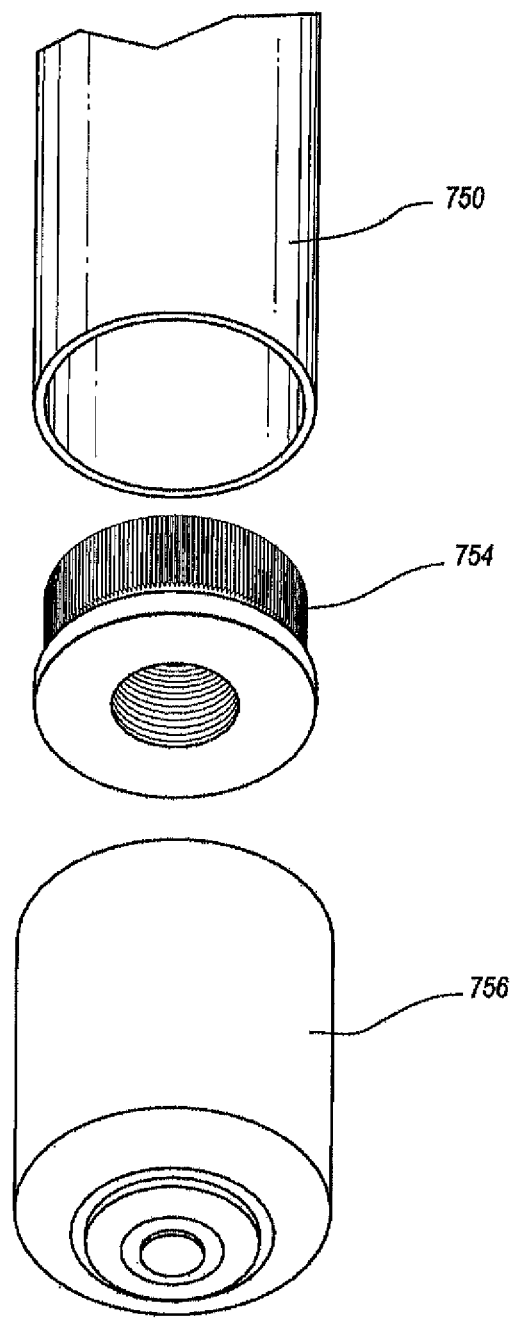
FIG. 19 is a perspective view of a bottom portion of a telescoping support stand according to certain embodiments.

FIG. 19 illustrates a bottom end of third tube 750. An attachment member 754 may be affixed to the bottom end of third tube 750. Attachment member 754 may be threaded to allow attachment member 754 to receive attachments. Attachment member 754 may be adapted to be attached to a walking knob, a spike, a hook, a ski pole attachment, or any other type of attachment. According to some embodiments, third tube 750 may be closed at the bottom end and may include a threaded hole capable of receiving such attachments. As shown in FIG. 19, end cap 756 may be placed on the bottom end of third tube 750 and over attachment member 754.

Figure 20:
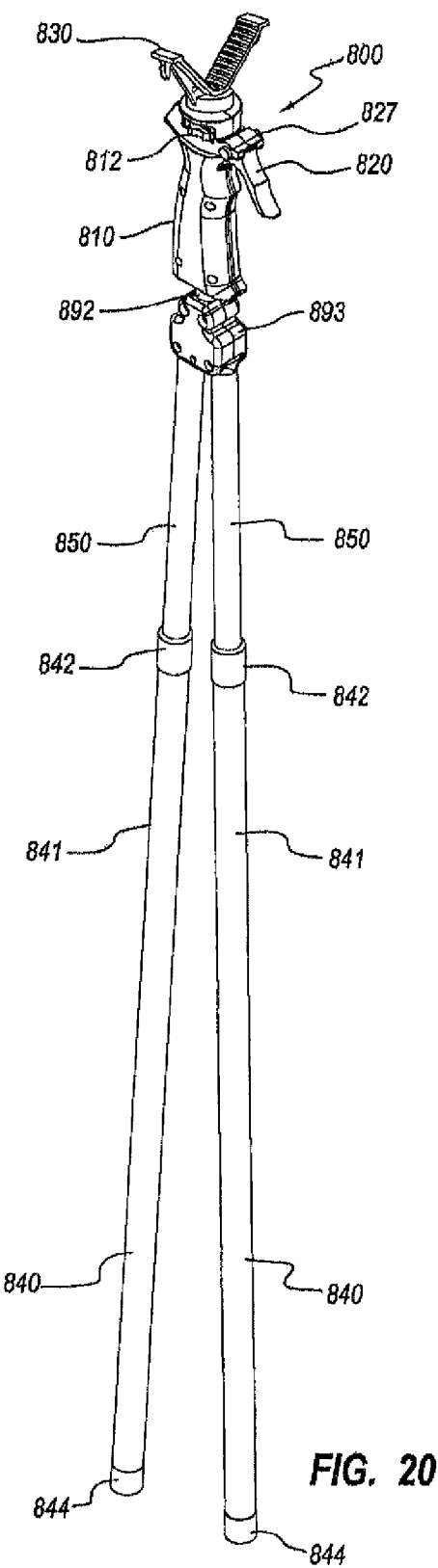
FIG. 20 is a perspective view of a telescoping support stand according to certain embodiments.
Figure 21:
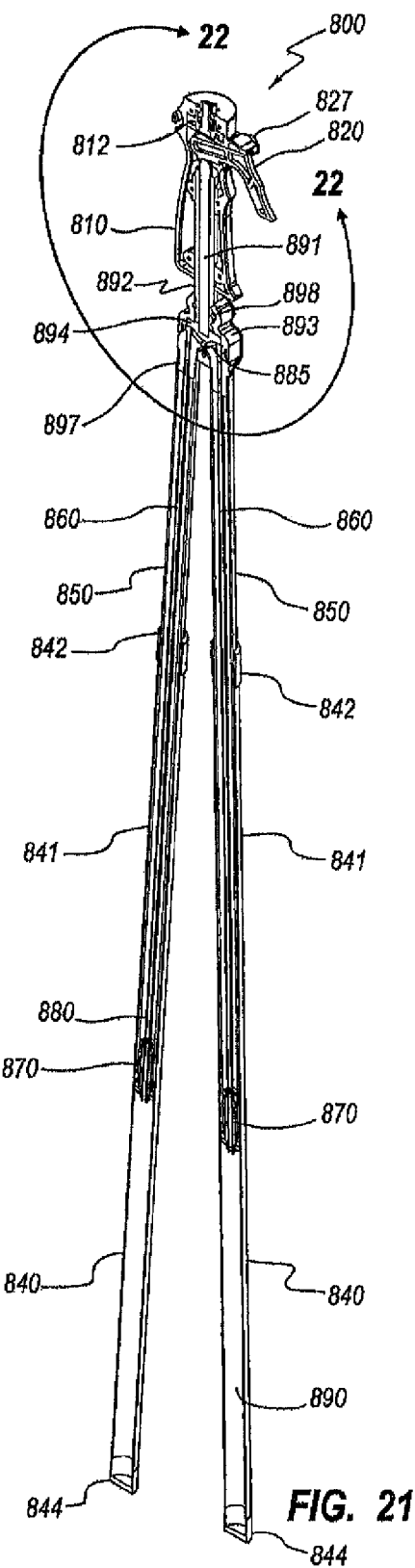
FIG. 21 is a cross-sectional perspective view of a telescoping support stand according to certain embodiments.

FIGS. 20 and 21 illustrate a telescoping support stand 800 having extendable legs 841. As shown in FIG. 20, telescoping support stand 800 may have a handle 810, a trigger 820, an accessory attachment member 812, a rest 830, and two or more extendable legs 841. In additional embodiments, handle 810 may include a trigger lock 827 configured to prevent and/or allow movement of trigger 820 with respect to handle 810. Extendable legs 841 may each include an inner tube 850, an outer tube 840, a first end cap 842 attached to a top end of outer tube 840, and a second end cap 844 attached to a bottom of outer tube 840. Additionally, telescoping support stand 800 may comprise a connection housing 893. Support stand 800 may also comprise a handle tube 892 coupling handle 810 to connection housing 893, as shown in FIG. 20. In the embodiment of FIG. 20, the handle 810 and handle tube 892 define a handle assembly to which the two or more extendable legs 841 are connected.

Figure 22:
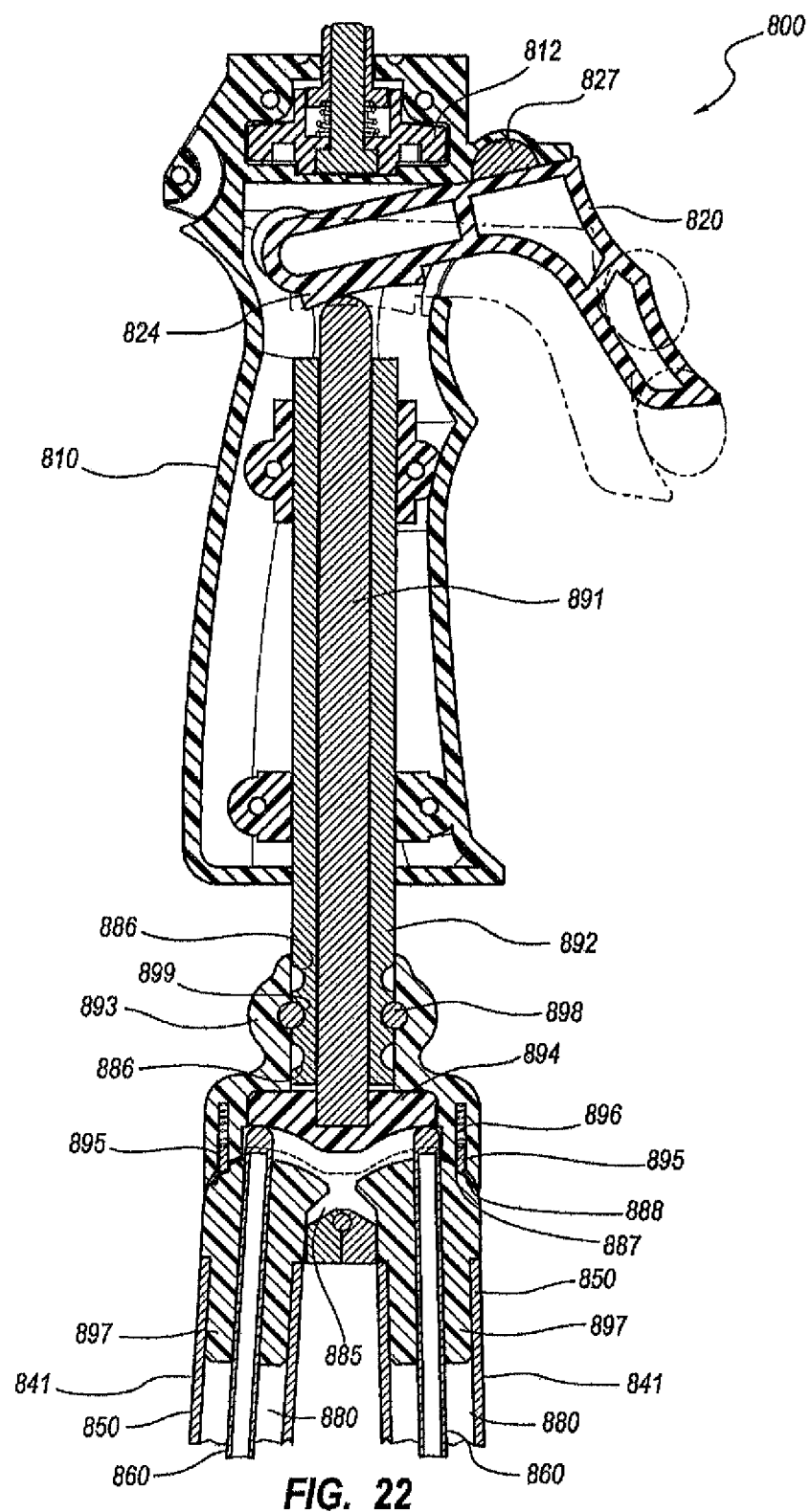
FIG. 22 is a cross-sectional side view of a top portion of a telescoping support stand according to certain embodiments.

Telescoping support stand 800 may comprise at least two extendable legs 841 that may each be adjusted by pulling trigger 820 attached to handle 810. As shown in FIG. 22, the trigger 820 pivots about an axis that is perpendicular to a direction of movement of the trigger 820 relative to handle 810 and perpendicular to a length dimension of the handle 810. FIG. 20 shows telescoping support stand 800 having two extendable legs 841 in a partially extended configuration. Extendable legs 841 may also be rotationally adjustable with respect to each other. Additionally, extendable legs 841 may be rotationally adjustable with respect to handle 810 and/or connection housing 893. Extendable legs 841 may be coupled to connection housing 893 and/or handle 810 through any suitable coupling means.

FIG. 21 is a cross-sectional perspective view of telescoping support stand 800 shown in FIG. 20. As shown in this figure, telescoping support stand 800 may also comprise a displacement rod 891, a displacement member 894, and an insert member 898 coupling handle tube 892 to connection housing 893. Joint members 897 may be disposed on and/or within an end portion of at least one of extendable legs 841. Joint members 897 may also be positioned at least partially within connection housing 893, coupling extendable legs 841 to connection housing 893. Additionally, telescoping support stand 800 may comprise an enclosed area 880 and an enclosed area 890 defined within each of extendable legs 841. In certain embodiments, telescoping support stand 800 may also comprise an enclosed area 885 adjacent extendable legs 841 and/or joint members 897.

In each of extendable legs 841, enclosed area 880 may be defined partially or completely within inner tube 850. As shown in FIG. 21, enclosed area 880 may be enclosed on the sides by inner tube 850, on the top by a joint member 897, and on the bottom by a locking mechanism 870. In certain embodiments, enclosed area 880 may also be at least partially defined within release rod 860 in at least one of extendable legs 841. Enclosed area 890 may be partially or completely enclosed within outer tube 840. Enclosed area 890 may be enclosed on the sides by outer tube 840, on the bottom by an end cap 844, and on the top by locking mechanism 870. Instead of being enclosed by end cap 844, in some embodiments enclosed area 890 may be enclosed by outer tube 840 at the bottom.

According to various embodiments, enclosed area 885 may be partially or completely defined within connection housing 893, as shown in FIG. 21. In certain embodiments, enclosed area 885 may also be at least partially within handle tube 892 and/or handle 810. According to various embodiments, the top end of enclosed area 880 in each of extendable legs 841 may be open to enclosed area 885. For example, an aperture may be formed in joint member 897, allowing air or other gas to flow between enclosed area 880 and enclosed area 885; as used herein, "air" may refer to any suitable gaseous composition, without limitation.

Telescoping support stand 800 may also comprise a locking mechanism 870. According to certain embodiments, locking mechanism 870 may divide enclosed area 880 from enclosed area 890. For example, locking mechanism 870 may be attached to an end of inner tube 850, as shown in FIG. 21. Locking mechanism 870 may also be disposed within inner tube 850 at a location other than an end of inner tube 850. For example, inner tube 850 may include openings that allow portions of locking mechanism 870 to extend through inner tube 850 and contact outer tube 840. Locking mechanism 870 may be capable of releasably securing inner tube 850 to outer tube 840 by pressing against an inside surface of outer tube 840. In certain embodiments, locking mechanism 870 may be attached to outer tube 840. Locking mechanism 870 may be the same structurally as the locking elements 170, 770 described above and illustrated with reference to FIGS. 1-19.

Enclosed areas 880 and 890 in each of extendable legs 841 may be completely or substantially air-tight. For example, end cap 844 may be sealed or attached to outer tube 840 such that little or no air can escape from enclosed area 890 through or around end cap 844. Release rod 860 may be secured at the top end of inner tube 850 such that little or no air can escape through the top of inner tube 850. In various embodiments, air may freely move directly or indirectly between a top portion of inner tube 850 and an exterior of telescoping support stand 800.

In additional embodiments, air may readily flow into and out of enclosed areas 880 and 890 in each of extendable legs 841 through a specific area of entry and exit. For example, outer tube 840 may be substantially or completely closed to air flow, except in and/or around locking mechanism 870, where enclosed area 890 may be open to enclosed area 880 in inner tube 850. Similarly, outer tube 840 may be substantially or completely closed to air flow, except in and/or around locking mechanism 870 as described, as well as in and/or around joint member 897, where enclosed area 880 may be open to enclosed area 885. Enclosed area 885 may be open to enclosed area 880 in one or more extendable legs 841 as described, and additionally, enclosed area 885 may be open to an exterior of telescoping support stand 800. Accordingly, air may enter telescoping support stand 800 primarily or solely through one or more openings between an exterior of telescoping support stand 800 and enclosed area 885, which may prevent debris and/or liquid from entering telescoping support stand 800 at a point substantially below connection housing 893, which may in turn protect interior portions of telescoping support stand 800 from damage and/or operational difficulties.

FIG. 22 is a cross-sectional view of handle 810, handle tube 892, and connection housing 893 coupled to extendable legs 841. As shown in this figure, enclosed area 885 may be at least partially defined within connection housing 893. Enclosed area 885 may also be at least partially defined by joint members 897 and/or release rods 860. Air may be exchanged between enclosed area 885 and an exterior of telescoping support stand 800 through any suitable route. For example, a space may be formed between connection housing 893 and at least one of joint members 897, allowing passage of air between enclosed area 885 and an exterior of telescoping support stand 800. In additional embodiments, an aperture may be formed in a portion of connection housing 893 allowing passage of air between enclosed area 885 and an exterior of telescoping support stand 800.

Air may also be exchanged between enclosed area 885 and enclosed area 880 in each of extendable legs 841 through any suitable route. For example, a space may be formed between joint member 897 and release rod 860, allowing passage of air between enclosed area 885 and enclosed area 880. In at least one embodiment, a space between joint member 897 and release rod 860 may be formed by providing an aperture through joint member 897 that has a larger diameter than an outer diameter of release rod 860. In certain embodiments, a hole may formed in joint member 897, allowing air exchange between enclosed area 885 and enclosed area 880. In additional embodiments, a space may be formed between joint member 897 and inner tube 850 and/or a hole may be formed in joint member 897, allowing air exchange between enclosed area 880 and an exterior of telescoping support stand 800.

While trigger 820 is shown in FIG. 22 to be attached to handle 810, trigger 820 may also be attached to other portions of telescoping support stand 800. For example, trigger 820 may be attached directly to handle tube 892. Additionally, trigger 820 may be positioned adjacent to displacement rod 891. Trigger 820 may be pulled toward handle 810 and/or handle tube 892 as illustrated in FIG. 22. As trigger 820 is pulled toward handle 810, a contact surface 824 of trigger 820 may contact and cause displacement rod 891 to slide in a longitudinal direction within handle tube 892. As shown in FIG. 22, displacement rod 891 slides in a direction substantially parallel to a length dimension of the handle tube 892. As further shown in FIG. 22, displacement rod 891 may be adjacent to and/or coupled to displacement member 894, and additionally, displacement member 894 may be adjacent to one or more release rods 860. Accordingly, displacement rod 891 may cause displacement member 894 to displace one or more release rods 860 longitudinally within one or more extendable legs 841, releasing locking mechanisms 870 in extendable legs 841 when trigger 820 is pulled toward handle 810. Thus, the displacement member 894 may be actuated by operation of the trigger 820 to simultaneously release all of the first locking mechanisms 870.

As shown in FIG. 22, where two or more release rods 860 are positioned adjacent to displacement member 894, displacement member 894 may displace the two or more release rods 860 simultaneously or substantially simultaneously. Accordingly, by pulling trigger 820, locking mechanisms 870 in two or more extendable legs 841 may be released simultaneously or substantially simultaneously, and therefore, two or more extendable legs 841 may be extended and/or contracted simultaneously or substantially simultaneously. Additionally, two or more extendable legs 841 may be extended and/or contracted separately by resisting the expansion or contraction of at least one of extendable legs 841 while allowing the expansion or contraction of at least an additional extendable leg 841.

Handle tube 892 and/or handle 810 may be coupled to connection housing 893 through any suitable coupling means. In at least one embodiment, as illustrated in FIG. 22, insert member 898 may couple handle tube 892 to connection housing 893. Insert member 898 may comprise any suitable member capable of securing handle tube 892 to connection housing 893, including, for example, a shoulder bolt. Insert member 898 may be disposed within connection housing 893 and in insert groove 899 defined in an exterior of handle tube 892. Insert groove 899 may be defined in a perimeter of handle tube 892. Additionally, handle tube 892 may be rotatable with respect to connection housing 893, thereby enabling rotation of handle 810 with respect to connection housing 893, and accordingly, with respect to extendable legs 841. Handle tube 892 may additionally comprise one or more grooves 886 defined in a perimeter of handle tube 892. In various embodiments, ball bearings and/or a gasket may be disposed within one or more grooves 886 to facilitate rotation of handle tube 892 with respect to connection housing 893, to balance handle tube 892 and/or to enable handle tube 892 to be held stationary with respect to connection housing 892. For example, grease packed ball bearings or a rubber gasket may enable handle tube 892 to be smoothly rotated and subsequently held in a desired position respective to connection housing 893, without requiring the use of a locking system to hold handle tube 892 in place.

Extendable legs 841 may be rotationally adjustable with respect to each other. Additionally, extendable legs 841 may be rotationally adjustable with respect to handle 810 and/or connection housing 893. According to at least one embodiment, at least one of extendable legs 841 may be attached to joint member 897 as shown in FIG. 22. Joint member 897 may be at least partially disposed within connection housing 893 and may be rotationally coupled to a portion of connection housing 893 through any suitable means. For example, a hole in joint member 897 may be coupled to a protruding pivot portion of connection housing 893 or a pivot member dispose within connection housing 893, joint member 897 being pivotable about the protruding pivot portion or pivot member. In additional embodiments, joint member 897 may disposed in connection housing 893 in such a manner that joint member 897 is held in place in place by at least an interior surface portion of connection housing 893 while being rotatable with respect to connection housing 893.

Telescoping support stand 800 may additionally comprise at least one holding member 895 and/or at least one holding spring 896. Each holding spring 896 and holding member 895 may be disposed at least partially within a recess defined within connection housing 893. Holding members 895 may hold extendable legs 841 in position and may prevent extendable legs 841 from undesirably rotating. Each holding member 895 may comprise a member formed to any suitable shape and size and may include a portion configured to fit within a corresponding first positioning notch 887 and/or a corresponding second positioning notch 888 defined in joint member 897. According to various embodiments, telescoping support stand 800 may comprise two or more holding members 895 and/or two or more holding springs 896 for each of joint members 897.

Holding spring 896 may be positioned between holding member 895 and joint member 897 such that holding spring 896 applies a force on holding member 895 toward joint member 897, biasing holding member 895 toward joint member 897. As shown in FIG. 22, holding spring 896 may apply a force to holding member 895, pressing a portion of holding member 895 into first positioning notch 887 on joint member 897, thereby preventing inadvertent rotation of joint member 897 and holding joint member 897, and likewise extendable leg 841, in place with respect to connection housing 893. It may be desirable to prevent joint member 897, and likewise extendable legs 841, from inadvertently rotating or moving in a variety of circumstances, such as, for example, when legs 841 are pressed close together while in transit from one location to another or when legs 841 are positioned and in use to stably support a device, such as a rifle or a camera.

Figure 23:
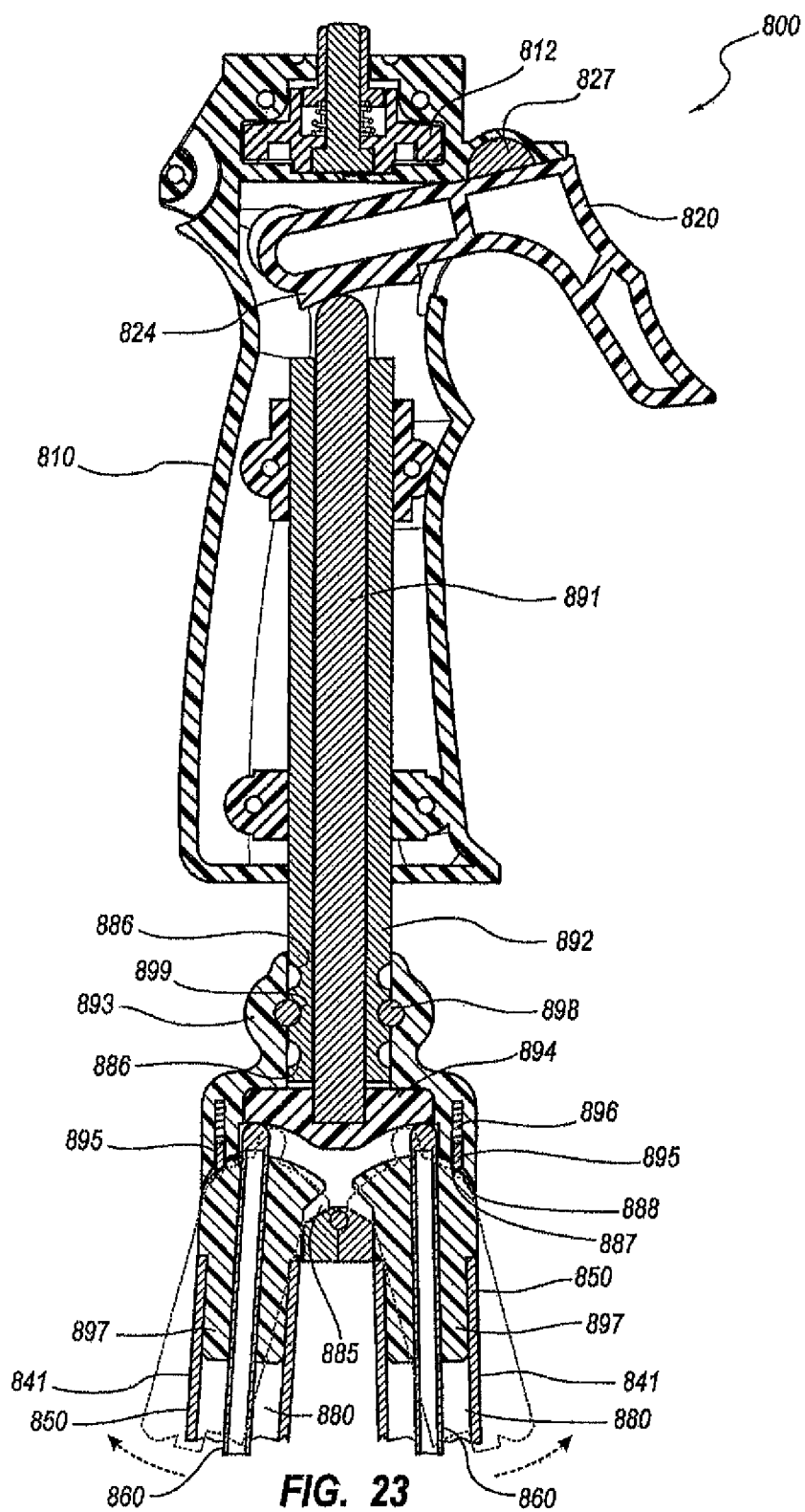
FIG. 23 is a cross-sectional side view of the top portion of a telescoping support stand according to certain embodiments.

FIG. 23 is a cross-sectional view of handle 810, handle tube 892, and connection housing 893 coupled to extendable legs 841. As shown in this figure, one or more of joint members 897 may be rotated with respect to connection housing 893. As described above, holding members 895 may hold joint members 897 in position under a variety of conditions. However, when additional force is applied to a joint member 897, such as a manual force applied to an extendable leg 841 and transferred to joint member 897, joint member 897 may rotate with respect to connection housing 893. As a joint member 897 is rotated respective to connection housing 893, joint member 897 may move holding member 895 out of first positioning notch 887 toward holding spring 896, compressing holding spring 896.

When joint member 897 is rotated to a point where second positioning notch 888 is positioned adjacent holding member 895, spring 896 which applies a force to holding member 895 may cause a portion of holding member 895 to be pressed in second positioning notch 888, as shown in FIG. 23. Holding member 895 may therefore be forced into second positioning notch 888, preventing inadvertent rotation of joint member 897 and holding extendable leg 841 in place with respect to connection housing 893. Accordingly, at least one of extendable legs 841 may be prevented from inadvertently rotating in a variety of circumstances, such as, for example, when legs 841 are extended and in use to stably support a device, such as a rifle or a camera.

Figure 24:
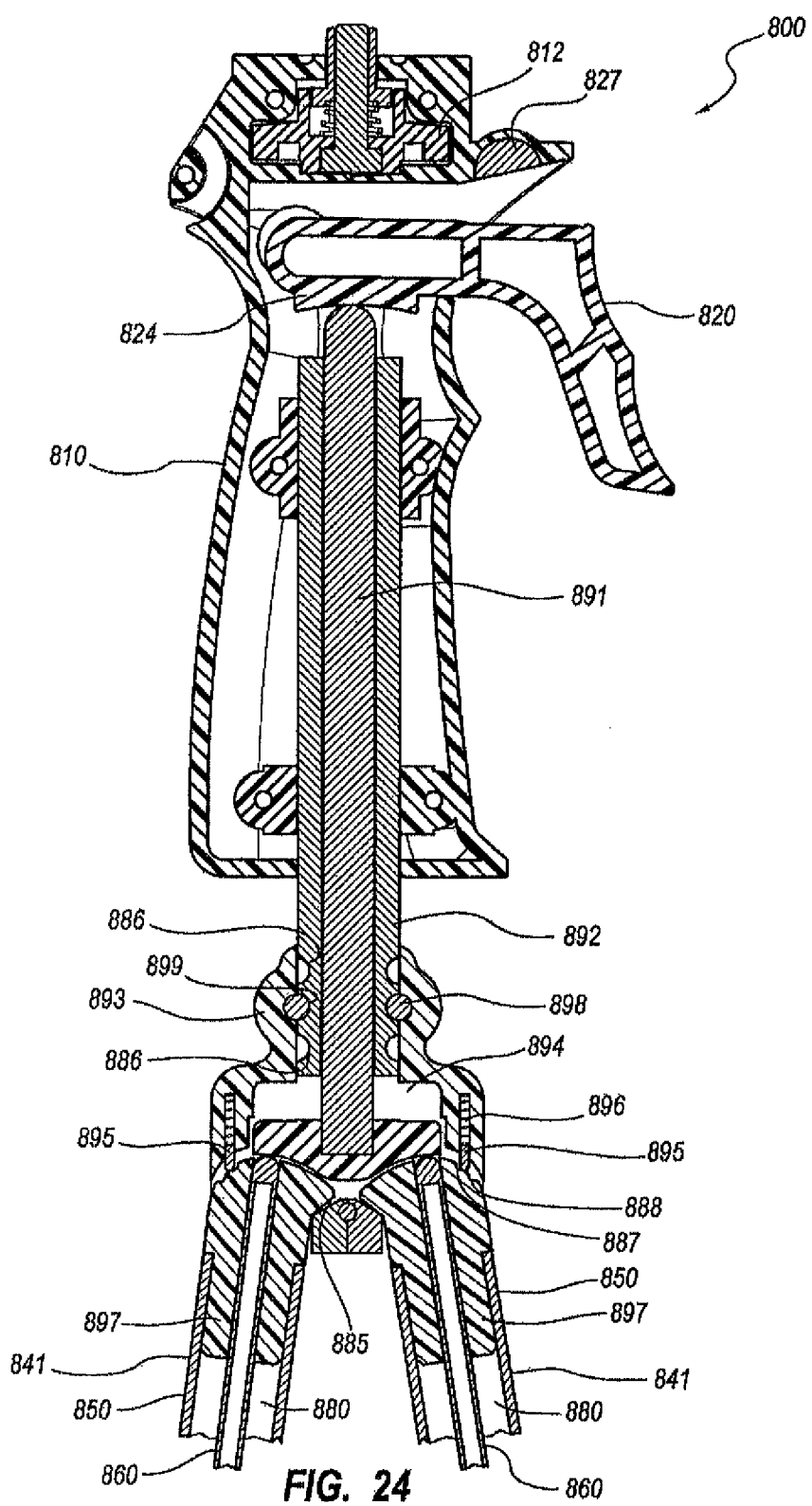
FIG. 24 is a cross-sectional side view of the top portion of a telescoping support stand according to certain embodiments.

FIG. 24 is cross-sectional view of handle 810, handle tube 892, and connection housing 893 coupled to extendable legs 841 that are rotated outward with respect to each other. As illustrated in this figure, joint members 897 may be positioned such that holding members 895 are pressed into second positioning notches 888. In this position, extendable legs 841 may be located further away from each other in comparison to a circumstance in which holding members 895 are pressed into first positioning notches 887. As shown in FIG. 24, displacement member 894 may be shaped such that release rod 860 is adjacent to displacement member 894 when holding members 895 are pressed into second positioning notches 888. Accordingly, when trigger 820 is pulled toward handle 810, trigger 820 may cause displacement member 894 to displace release rods 860, regardless of the orientation of joint members 897 with respect to connection housing 893.

Figure 25:
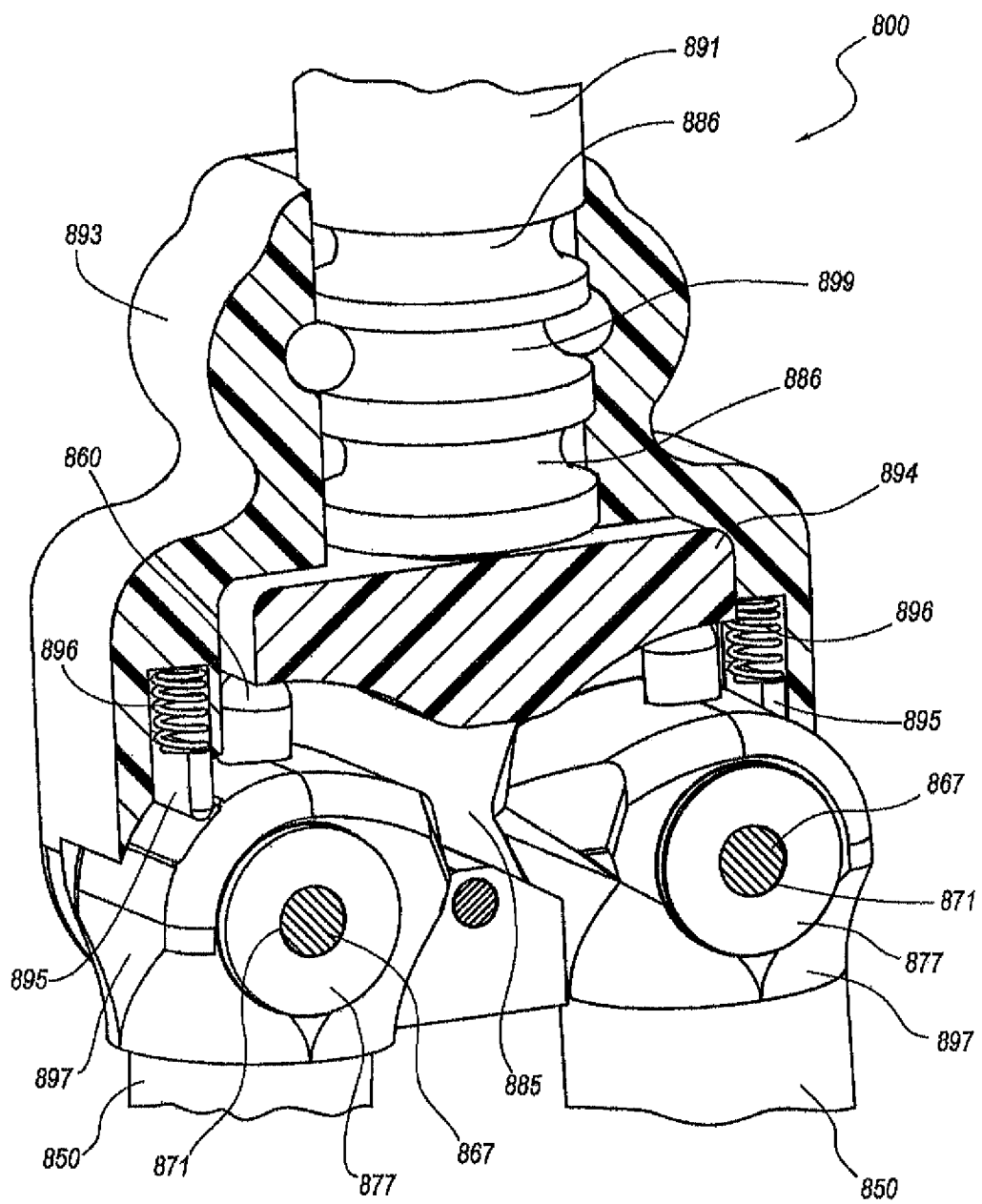
FIG. 25 is a cut-away perspective view of a connection housing of a telescoping support stand according to certain embodiments.

FIG. 25 is a cut-away perspective view of connection housing 893 according to various embodiments. As shown in this figure, joint members 897 may comprise rotational apertures 871 defined within a portion of joint members 897. Each of rotational apertures 871 may be configured to rotate about a pivot member in connection housing 893. Pivot members 867 may be coupled to connection housing 893 and at least partially inserted into rotational apertures 871, securing joint members 897 to connection housing 893 and/or allowing rotation of joint members 897 with respect to connection housing 893. Additionally, telescoping support stand 800 may comprise washers 877 between joint members 897 and connection housing 893 to facilitate rotation of joint members 897 and/or to prevent wear to joint members 897 and/or connection housing 893.

Additionally, FIG. 25 shows additional details of grooves 886 and insert groove 899 defined in handle tube 892. As shown in this figure, grooves 886 and/or insert groove 899 may be defined in an outer portion of handle tube 892, at least partially extending around the periphery of handle tube 892. As also illustrated in this figure, each of holding members 895 may be pressed against a portion of a joint member 897 by one or more holding springs 896 disposed between the holding member and connection housing 893.

Figures 26, 27:
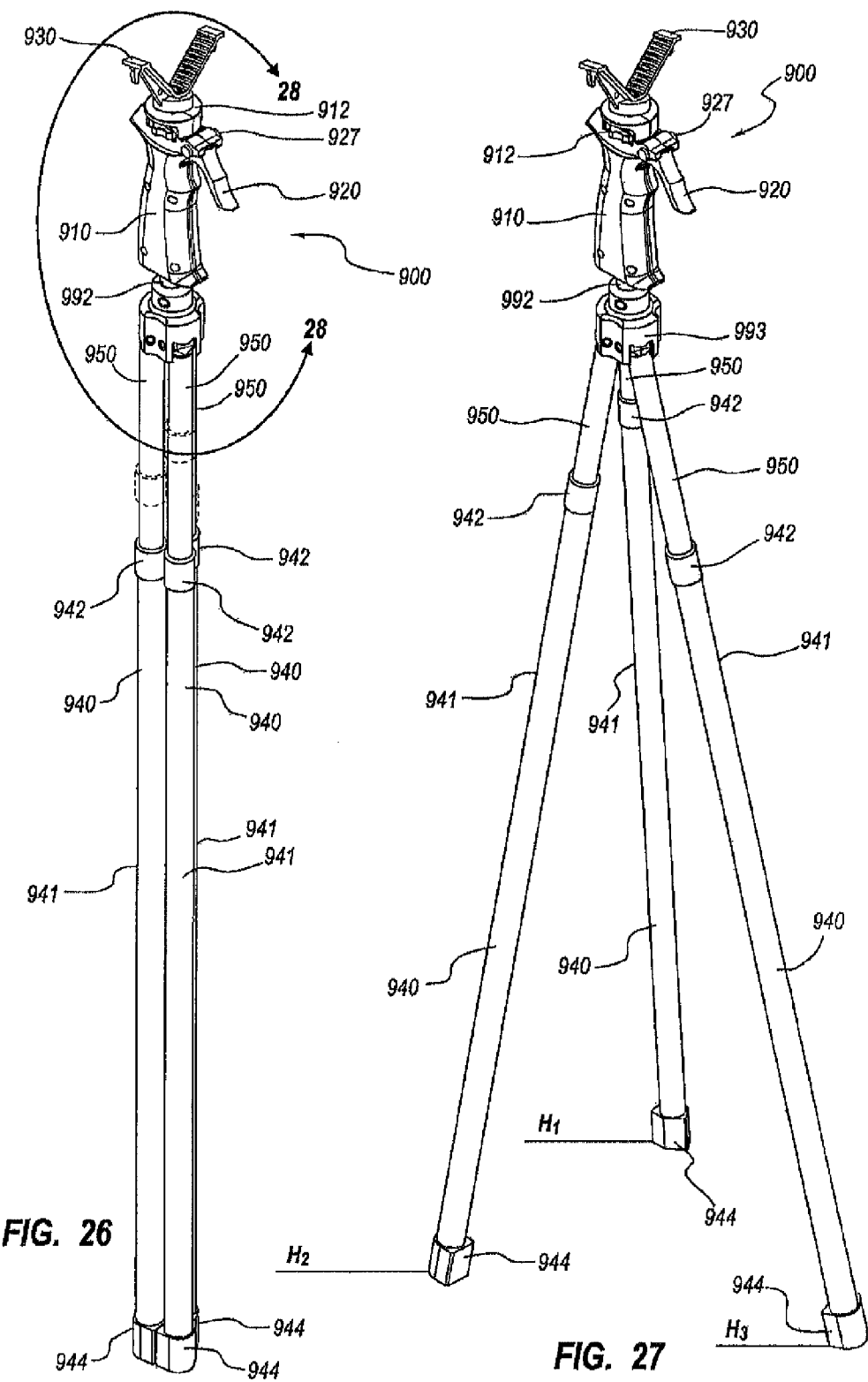
FIG. 26 is a perspective view of a telescoping support stand according to certain embodiments.
FIG. 27 is a perspective view of a telescoping support stand according to certain embodiments.

FIGS. 26 and 27 illustrate a telescoping support stand 900 having three extendable legs 941. As shown in these figures, telescoping support stand 900 may have a handle 910, a trigger 920, an accessory attachment member 912, a rest 930, and two or more extendable legs 941. In certain embodiments, handle 910 may include a trigger lock 927 configured to prevent and/or allow movement of trigger 920 with respect to handle 910. Extendable legs 941 may each include an inner tube 950, an outer tube 940, a first end cap 942 attached to a top end of outer tube 940, and a second end cap 944 attached to a bottom of outer tube 940. Additionally, telescoping support stand 900 may comprise a connection housing 993. Support stand 900 may also comprise a handle tube 992 coupling handle 910 to connection housing 993.

Telescoping support stand 900 may also comprise three or more extendable legs 941 that may each be adjusted by pulling trigger 920 attached to handle 910. FIGS. 26 and 27 show telescoping support stand 900 having three extendable legs 941 in a partially extended configuration. Each of extendable legs 941 may be rotationally adjustable with respect to handle 910 and/or connection housing 993. Extendable legs 941 may also be rotationally adjustable with respect to each other.

FIG. 26 shows a telescoping support stand 900 having extendable legs 941 in a configuration where each of extendable legs 941 is adjacent and substantially parallel to each of the other extendable legs 941. In this configuration, magnets in end caps 944 of extendable legs 941 may help prevent extendable legs 941 from separating from one another in a variety of conditions, such as, for example, when telescoping support stand 900 is in transit from one location to another. Magnets in end caps 944 of extendable legs 941 may be attracted to each other with force sufficient to prevent extendable legs 941 from separating under a variety of conditions, while allowing for extendable legs 941 to be manually separated from one another by a user of telescoping support stand 900. FIG. 27 shows a telescoping support stand 900 having extendable legs 941 in a configuration where each of extendable legs 941 is rotated with respect to connection housing 993 in a direction generally outward with respect to each of the other extendable legs 941.

Extendable legs 941 may be coupled to connection housing 993 and/or handle 910 through any suitable coupling means. In certain embodiments, extendable legs may be rotationally adjustable either individually or collectively with respect to connection housing 993. According to additional embodiments, pulling trigger 920 may release locking mechanisms in two or more extendable legs 941 simultaneously or substantially simultaneously, which may in turn enable three or more extendable legs 941 to be extended and/or contracted simultaneously. Telescoping support stand 900 having multiple extendable legs 941 that are rotationally adjustable and that may be extended and/or contracted simultaneously and that may be easily and quickly deployed and/or adjusted to suit a variety of conditions and environments.

FIGS. 26 and 27 further illustrate various configurations of extendable legs 941 on telescoping support stand 900. Extendable legs 941 may be extended to varying lengths, enabling extendable legs 941 to be quickly and efficiently deployed on a variety of surfaces and terrains. For example, extendable legs 941 may be deployed from a contracted position by holding handle 910 in a desired orientation relative to a particular surface and pulling trigger 920 toward handle 910, thereby releasing locking mechanisms 970 in extendable legs 941. According to at least one embodiment, when locking mechanisms 970 are released, extendable legs 941 may automatically extend under gravitational force until second end caps 944 contact a surface, such as a ground surface, for example. In other words, when locking mechanisms 970 are released, gravitational force may cause outer tubes 940 to slide relative to inner tubes 950 toward surface 965 until second end caps 944 on outer tubes 940 contact a surface. In certain embodiments, at least one of extendable legs 941 may be rotated outward with respect to connection housing 993, and subsequently, trigger 920 may be pulled toward handle 910 to deploy extendable legs 941 in the desired orientation.

Once second end caps 944 come into contact with a surface, telescoping support stand 900 may be further adjusted by holding trigger 920 pulled toward handle 910 and adjusting the position of handle 910 relative to extendable legs 941 and second end caps 944 contacting surface 965. Once a desired positions for handle 910 is obtained, trigger 920 may be released and/or moved away from handle 910, thereby engaging locking mechanisms 970. When locking mechanisms 970 are engaged, outer tube 940 may be prevented from sliding relative to inner tubes 950. If further adjustment is required, trigger 920 may again be pulled toward handle 910, and the position of handle 910 may be adjusted relative to extendable legs 941 and second end caps 944. Extendable legs 941 may also be contracted by pulling trigger 920 toward handle 910 and sliding outer tubes 940 relative to inner tubes 950 toward connection housing 993, either by manually sliding outer tubes 940 or by turning telescoping support stand 900 upside down.

Extendable legs 941 may be adjusted to varying lengths depending on the height and position of handle 910 and on the characteristics of a particular surface. For example, as shown in FIGS. 26 and 27, extendable legs 941 may be extended to varying length to suit a particular surface so as to maintain handle 910 in a substantially upright position, for example. Accordingly, telescoping support stand 900 may be quickly and efficiently deployed in a variety of circumstances. Additionally, telescoping support stand 900 having two or more extendable legs 941 that may be deployed and adjusted with one hand using trigger 920 to extend extendable legs 941 as described.

Figure 28:
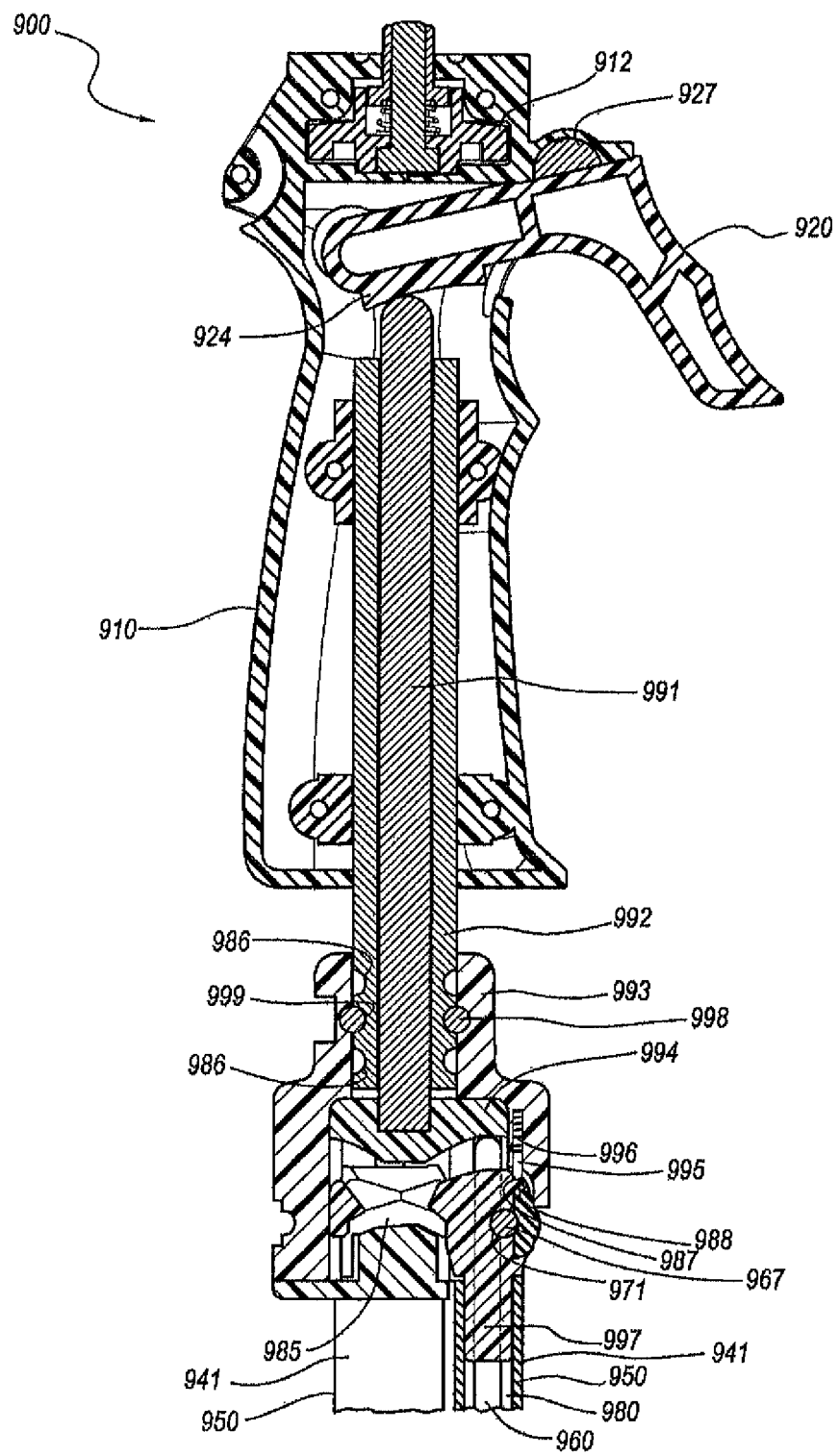
FIG. 28 is a cross-sectional side view of a top portion of a telescoping support stand according to certain embodiments.

FIG. 28 is a cross-sectional side view of handle 910, handle tube 992, and connection housing 993 coupled to extendable legs 941. As shown in this figure, enclosed area 985 may be at least partially defined within connection housing 993. Air may be exchanged between enclosed area 985 and an exterior of telescoping support stand 900 through any suitable route, as described above (see, e.g., FIG. 22). Air may also be exchanged between enclosed area 985 and enclosed area 980 in each of extendable legs 941 through any suitable route. For example, a space may be formed between joint member 997 and release rod 960, allowing passage of air between enclosed area 985 and enclosed area 980. In certain embodiments, a hole may formed in joint member 997, allowing air exchange between enclosed area 985 and enclosed area 980. In additional embodiments, a space may be formed between joint member 997 and inner tube 950 and/or a hole may be formed in joint member 997, allowing air exchange between enclosed area 980 and an exterior of telescoping support stand 900.

Trigger 920 may be attached to handle 910 or any other suitable portion of telescoping support stand 900. As trigger 920 is pulled toward handle 910, a contact surface 924 of trigger 920 may contact and cause displacement rod 991 to slide in a longitudinal direction within handle tube 992. As shown in FIG. 28, displacement rod 991 may be adjacent to and/or coupled to displacement member 994, and additionally, displacement member 994 may be adjacent to one or more release rods 960. Accordingly, displacement rod 991 may cause displacement member 994 to displace one or more release rods 960 longitudinally within one or more extendable legs 941, releasing locking mechanism 970 in the extendable legs 941 when trigger 920 is pulled toward handle 910. Where two or more release rods 960 are positioned adjacent to displacement member 994, displacement member 994 may displace the two or more release rods 960 simultaneously or substantially simultaneously. Accordingly, by pulling trigger 920, locking mechanisms 970 in two or more extendable legs 941 may be released simultaneously or substantially simultaneously, and therefore, two or more extendable legs 941 may be extended and/or contracted simultaneously or substantially simultaneously.

Handle tube 992 and/or handle 910 may be coupled to connection housing 993 through any suitable coupling means. For example, insert member 998 may couple handle tube 992 to connection housing 993. Insert member 998 may comprise any suitable member capable of securing handle tube 992 to connection housing 993, including, for example, a shoulder bolt. Insert member 998 may be disposed within connection housing 993 and in insert groove 999 formed in an exterior of handle tube 992. Handle tube 992 may additionally comprise one or more grooves 986 defined in a perimeter of handle tube 992. In various embodiments, ball bearings and/or a gasket may be disposed within one or more grooves 986 to facilitate rotation of handle tube 992 with respect to connection housing 993, to balance handle tube 992, and/or to enable handle tube 992 to be held stationary with respect to connection housing 992.

Extendable legs 941 may be rotationally adjustable with respect to each other. Additionally, extendable legs 941 may be rotationally adjustable with respect to handle 910 and/or connection housing 993. According to at least one embodiment, at least one of extendable legs 941 may be attached to joint member 997 as shown in FIG. 28. Joint member 997 may be at least partially disposed within connection housing 993 and may be rotationally coupled to a portion of connection housing 993 through any suitable means. Telescoping support stand 900 may additionally comprise at least one holding member 995 and/or at least one holding spring 996. Holding members 995 may hold extendable legs 941 in position and may prevent extendable legs 941 from undesirably rotating (see, e.g., FIG. 22). Each holding member 995 may comprise a member formed to any suitable shape and size and may include a portion configured to fit within a corresponding first positioning notch 987 and/or a corresponding second positioning notch 988 defined in joint member 997.

Figure 29:
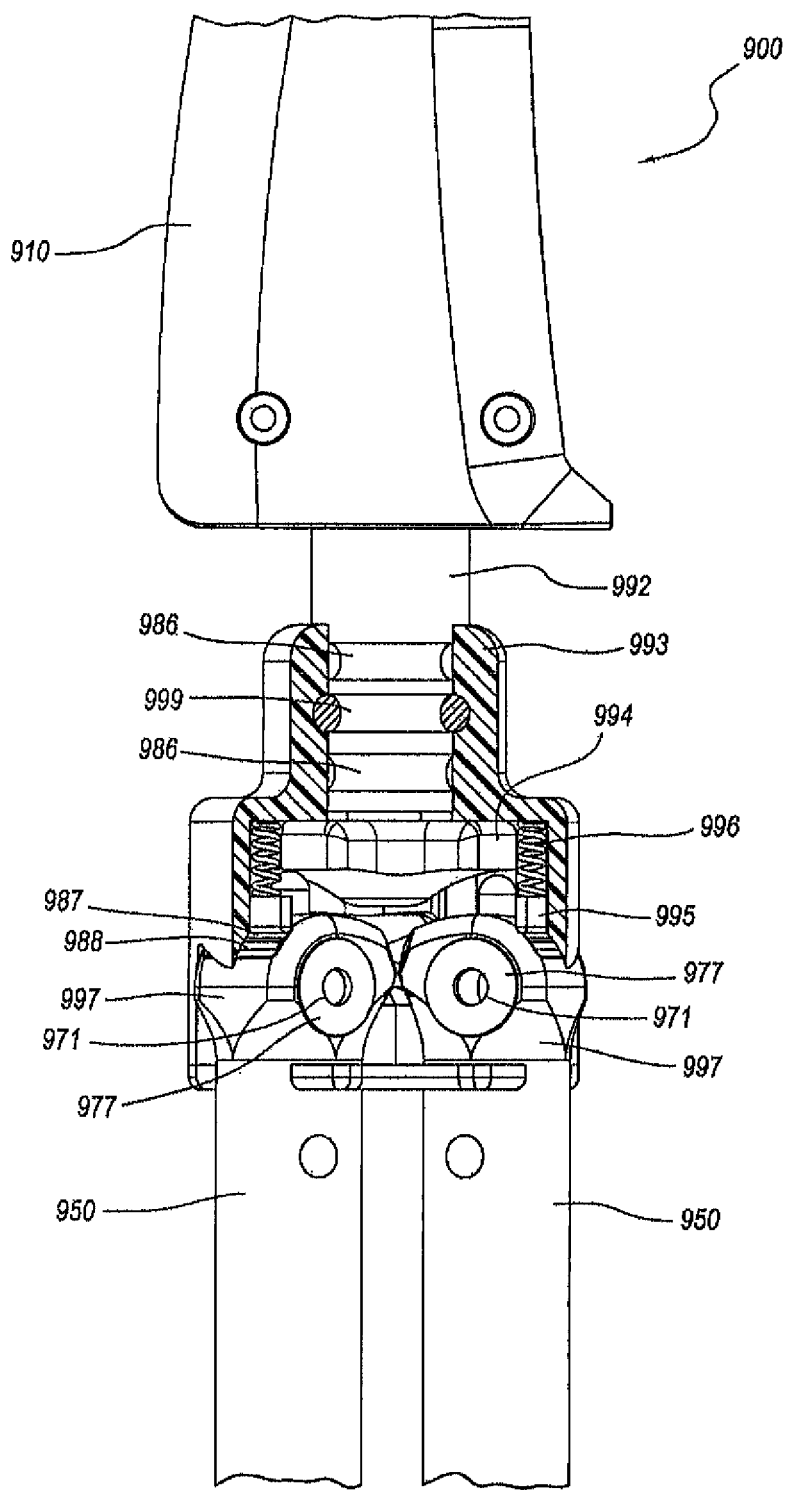
FIG. 29 is a cut-away side view of a connection housing of a telescoping support stand according to certain embodiments.

FIG. 29 is a cut-away side view of connection housing 993 according to various embodiments. As shown in this figure, joint members 997 may comprise rotational apertures 971 defined within a portion of joint members 997. Each of rotational apertures 971 may be configured to rotate about a pivot portion or pivot member disposed in connection housing 993. According to additional embodiments, pivot members may be coupled to connection housing 993 and may be at least partially inserted into rotational apertures 971, securing joint members 997 to connection housing 993 and/or allowing rotation of joint members 997 with respect to connection housing 993. Additionally, telescoping support stand 900 may comprise washers 977 between joint members 997 and connection housing 993 to facilitate rotation of joint members 997 and/or to prevent wear to joint members 997 and/or connection housing 993.

Additional details of displacement member 994 and connection housing 993 are illustrated in FIG. 29. According to at least one embodiment, as shown in this figure, displacement member 994 may have protruding portions that fit within corresponding recessed portions formed within connection housing 993. The recessed portions formed within connection housing 993 may maintain displacement member 994 in a desired configuration as displacement member 994 is moved within connection housing 993.

The telescoping support stands described herein may be monopods, bipods, tripods, quadrapods, etc. Telescoping support stands may be used as shooting sticks, hiking sticks, optical equipment stands, microphone stands, telescope stands, or any other type of support stand. Telescoping support stands may be made in various shapes and sizes and the leg or legs of the telescoping support stands may have any number of telescoping tubes.

The preceding description has been provided to enable others skilled in the art to best utilize various aspects of the exemplary embodiments described herein. This exemplary description is not intended to be exhaustive or to be limited to any precise form disclosed. Many modifications and variations are possible without departing from the spirit and scope of the instant disclosure. It is desired that the embodiments described herein be considered in all respects illustrative and not restrictive, and that reference be made to the appended claims and their equivalents for determining the scope of the instant disclosure. In addition, for ease of use, the words "including" and "having," as used in the specification and claims, are interchangeable with and have the same meaning as the word "comprising."

What is claimed is:

1. A telescoping support stand, comprising:
    a handle assembly;
    at least one extendable leg, comprising:
        a first tube;
        a second tube having a first end portion that telescopically slides within the first tube and a second end portion connected to the handle assembly;
        a locking mechanism mounted to the first end portion of the second tube;
        a release rod extending from the handle assembly to the locking mechanism;
    a release assembly mounted to the handle assembly, the release assembly comprising:
        a displacement member in contact with the release rod;
        a displacement rod operable in a direction substantially parallel to a length dimension of the release rod to actuate the displacement member to axially move the release rod, the release rod operating the locking mechanism to control relative movement between the first and second tubes.

2. The telescoping support stand of claim 1, wherein the release assembly includes a trigger accessible outside the handle assembly, the release assembly being coupled to the trigger.

3. The telescoping support stand of claim 2, wherein the trigger includes first and second ends, the first end being pivotally attached to the handle assembly and the second end being movable radially inward and radially outward during operation.

4. The telescoping support stand of claim 2, wherein the trigger is biased into a rest position extending radially outward from the handle assembly, the first tube being fixed axially relative to the second tube when the trigger is in the rest position.

5. The telescoping support stand of claim 2, wherein the trigger pivots about an axis arranged perpendicular to a length dimension of the first and second tubes.

6. The telescoping support stand of claim 2, wherein the handle assembly includes a handle grip configured to be grasped by a user's hand while operating the trigger with the same hand.

7. The telescoping support stand of claim 1, wherein the displacement member is movable longitudinally in the handle assembly.

8. The telescoping support stand of claim 1, wherein the displacement member comprises at least one concave surface arranged to interface with the release rod.

9. The telescoping support stand of claim 2, wherein the trigger is coupled to the locking mechanism with the release assembly and release rod.

10. The telescoping support stand of claim 1, further comprising a first air exchange aperture at the second end portion of the second tube and configured to allow air to exit the second tube.

11. The telescoping support stand of claim 10, further comprising a second air exchange aperture defined at least in part by the locking mechanism and configured to allow air to flow between the first and second tubes.

12. The telescoping support stand of claim 10, wherein the first air exchange aperture is accessed through a distal open end of the second tube.

13. A telescoping support stand, comprising: a handle assembly; at least one extendable leg, comprising: a first tube; a second tube having a first end portion that telescopically slides within the first tube and a second end portion connected to the handle assembly; a locking mechanism mounted to the first end portion of the second tube; a release rod extending from the handle assembly to the locking mechanism; a release assembly mounted within the handle assembly and operable to simultaneously move all of the release rods to operate all of the locking mechanisms of the telescoping support stand, the release assembly comprising a displacement member and a displacement rod, the displacement member being couple between the displacement rod and the release rod, wherein the displacement rod is operable in a direction substantially parallel to a length dimension of the release rod.

14. The telescoping support stand of claim 13, wherein the displacement member is arranged in contact with a proximal end of the release rod and operable to axially move the release rod to operate the locking mechanism.

15. The telescoping support stand of claim 14, wherein the displacement rod is operable to actuate the displacement member.

16. The telescoping support stand of claim 13, further comprising a trigger mounted to the handle assembly, the trigger being operable in a direction perpendicular to movement of the displacement rod to actuate the release assembly.

17. The telescoping support stand of claim 16, wherein the handle assembly comprises a handle grip, the trigger being positioned adjacent to the handle grip for operation by an operator's hand that is grasping the handle grip.

18. A method of operating a telescoping support stand, comprising:
    providing a telescoping support stand having a handle assembly, a release assembly, and at least one extendable leg, the at least one extendable leg comprising a first tube, a second tube having a first end portion that telescopically slides within the first tube and a second end portion connected to the handle assembly, a locking mechanism mounted to the first end portion of the second tube, a release rod extending from the handle assembly to the locking mechanism, the release assembly comprising a displacement rod and a displacement member in contact with the release rod;

operating the displacement rod along a length dimension of the handle assembly to actuate the displacement member, the displacement member moving the release rod axially when actuated;

wherein axial movement of the release rod operates the locking mechanism to control relative movement between the first and second tubes.

19. The method of claim 18, wherein the telescoping support stand further comprises a trigger mounted to the handle assembly, wherein operating the trigger operates the displacement rod.

20. The method of claim 18, wherein the at least one extendable leg comprises a plurality of extendable legs, and operating the displacement rod to actuate the displacement member simultaneously moves the release rod of each extendable leg.

21. The method of claim 19, wherein operating the trigger includes moving the trigger in a direction perpendicular to a direction of movement of the displacement rod.

22. A method of operating a telescoping support stand, comprising:

providing a telescoping support stand having a handle assembly, a release assembly, and a plurality of extendable legs, each of the plurality of extendable legs comprising a first tube, a second tube having a first end portion that telescopically slides within the first tube and a second end portion connected to the handle assembly, a locking mechanism mounted to the first end portion of the second tube, a release rod extending from the handle assembly to the locking mechanism, the release assembly comprising a displacement rod and a displacement member in contact with the release rod;

operating the displacement rod to actuate the displacement member, the displacement member simultaneously moving the release rod of each extendable leg axially when actuated;

wherein axial movement of the release rod operates the locking mechanism to control relative movement between the first and second tubes.

* * * * *